(12) United States Patent
Siemens et al.

(10) Patent No.: US 10,487,910 B2
(45) Date of Patent: Nov. 26, 2019

(54) ABSORBER-TYPE VIBRATION DAMPER

(71) Applicant: ZF Friedrichshafen AG, Friedrichshafen (DE)

(72) Inventors: Kyrill Siemens, Wuerzburg (DE); Michael Wirachowski, Wuerzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/677,209

(22) Filed: Aug. 15, 2017

(65) Prior Publication Data

US 2018/0045268 A1 Feb. 15, 2018

Related U.S. Application Data

(62) Division of application No. 14/772,442, filed as application No. PCT/EP2014/053206 on Feb. 19, 2014.

(30) Foreign Application Priority Data

Mar. 18, 2013 (DE) .......................... 10 2013 204 711

(51) Int. Cl.
*F16F 15/14* (2006.01)
*F16F 7/108* (2006.01)

(52) U.S. Cl.
CPC ............ *F16F 15/145* (2013.01); *F16F 7/108* (2013.01)

(58) Field of Classification Search
CPC ...... F16F 15/145; F16F 15/1435; F16F 15/14; F16F 15/13128; F16F 15/1202;
(Continued)

(56) References Cited

U.S. PATENT DOCUMENTS 5,976,020 A * 11/1999 Lohaus ............... F16F 15/1205
192/30 V
6,280,330 B1 8/2001 Eckel
(Continued)

FOREIGN PATENT DOCUMENTS

DE 102011100895 12/2011
DE 102011102812 A1 * 12/2011 ............ F16F 15/145
(Continued)

*Primary Examiner* — Bradley T King
*Assistant Examiner* — Stephen M Bowes
(74) *Attorney, Agent, or Firm* — Cozen O'Connor

(57) ABSTRACT

A tuned mass vibration damper for damping a vibration component of a rotational movement, includes at least three damper masses, at least one guide component part to movably guide the at least three damper masses such that the damper masses are arranged so as to be offset along a circumferential direction perpendicular to an axis of rotation and can carry out the oscillations, and a damping component part rotatable around the axis of rotation of the rotational movement opposite to the at least one guide component part and which comprises a support structure and at least two damping structures connected to the support structure. The damping structures extend radially from the support structure and are constructed and arranged such that one damping structure of the at least two damping structures when making contact with one of two adjacent damper masses prevents a contact of the two adjacent damper masses.

1 Claim, 30 Drawing Sheets

(58) Field of Classification Search
CPC ............... F16F 15/1212; F16F 15/1215; F16F 15/1331; F16F 15/1336; F16F 7/108; Y10T 74/2128
USPC ........................................................ 74/574.2
See application file for complete search history.

(56) References Cited

U.S. PATENT DOCUMENTS

| | | |
|---|---|---|
| 6,358,153 B1 | 3/2002 | Carlson |
| 6,382,050 B1 | 5/2002 | Carlson |
| 9,032,837 B2 | 5/2015 | Klotz |
| 2012/0222515 A1 | 9/2012 | Kinoshita |
| 2013/0139641 A1* | 6/2013 | Schierling ............ F16F 15/145 74/574.4 |
| 2013/0283967 A1* | 10/2013 | Movlazada ........... F16F 15/145 74/574.2 |
| 2015/0316124 A1 | 11/2015 | Wirachowski |

FOREIGN PATENT DOCUMENTS

| | | | |
|---|---|---|---|
| DE | 102012214214 | 3/2013 | |
| DE | 102013202704 A1 * | 9/2013 | ............ F16F 15/145 |
| EP | 2667050 | 11/2013 | |
| FR | 2986296 A1 * | 8/2013 | ............ F16F 15/145 |
| FR | 2990736 A1 * | 11/2013 | ............ F16F 15/145 |

* cited by examiner

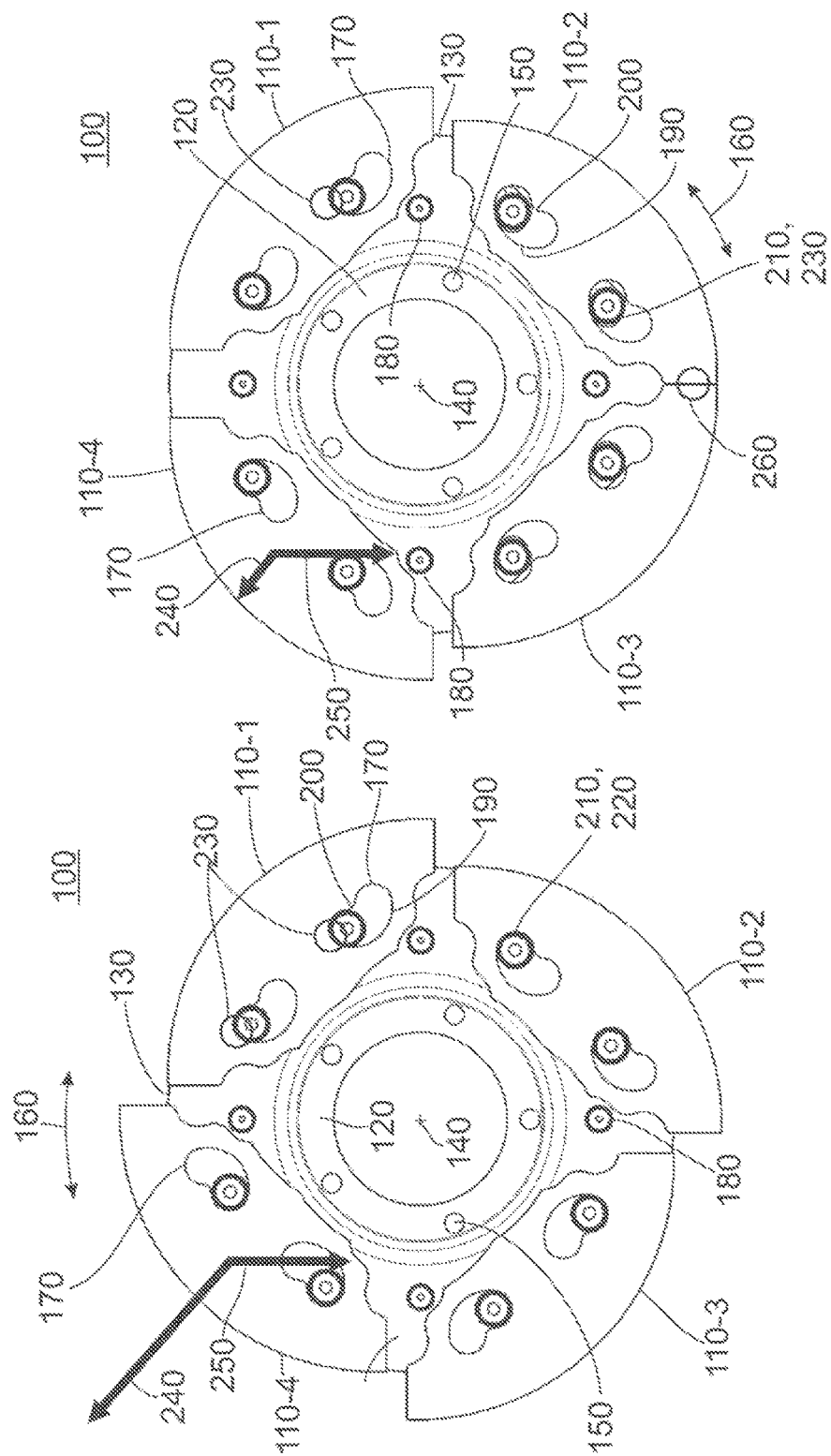

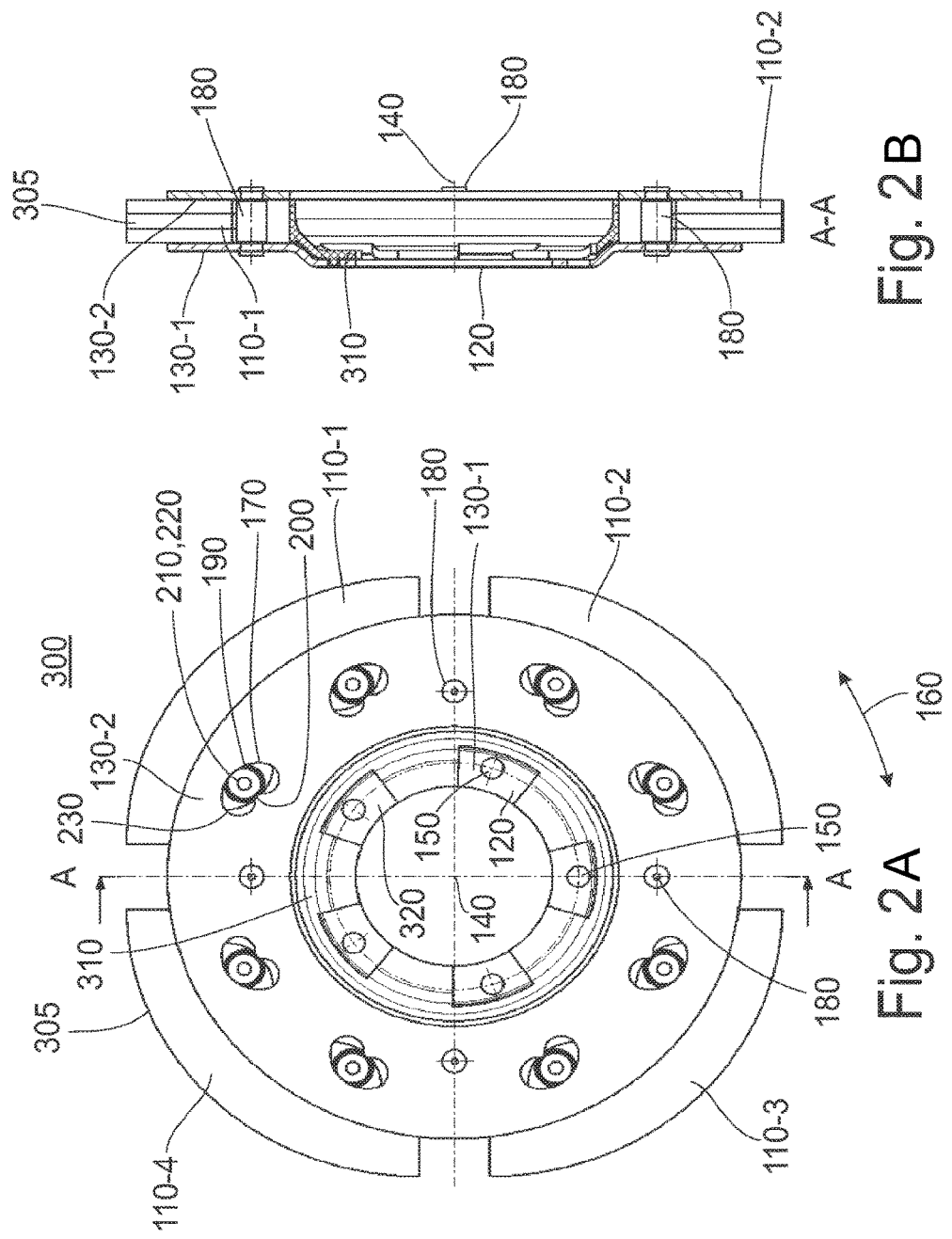

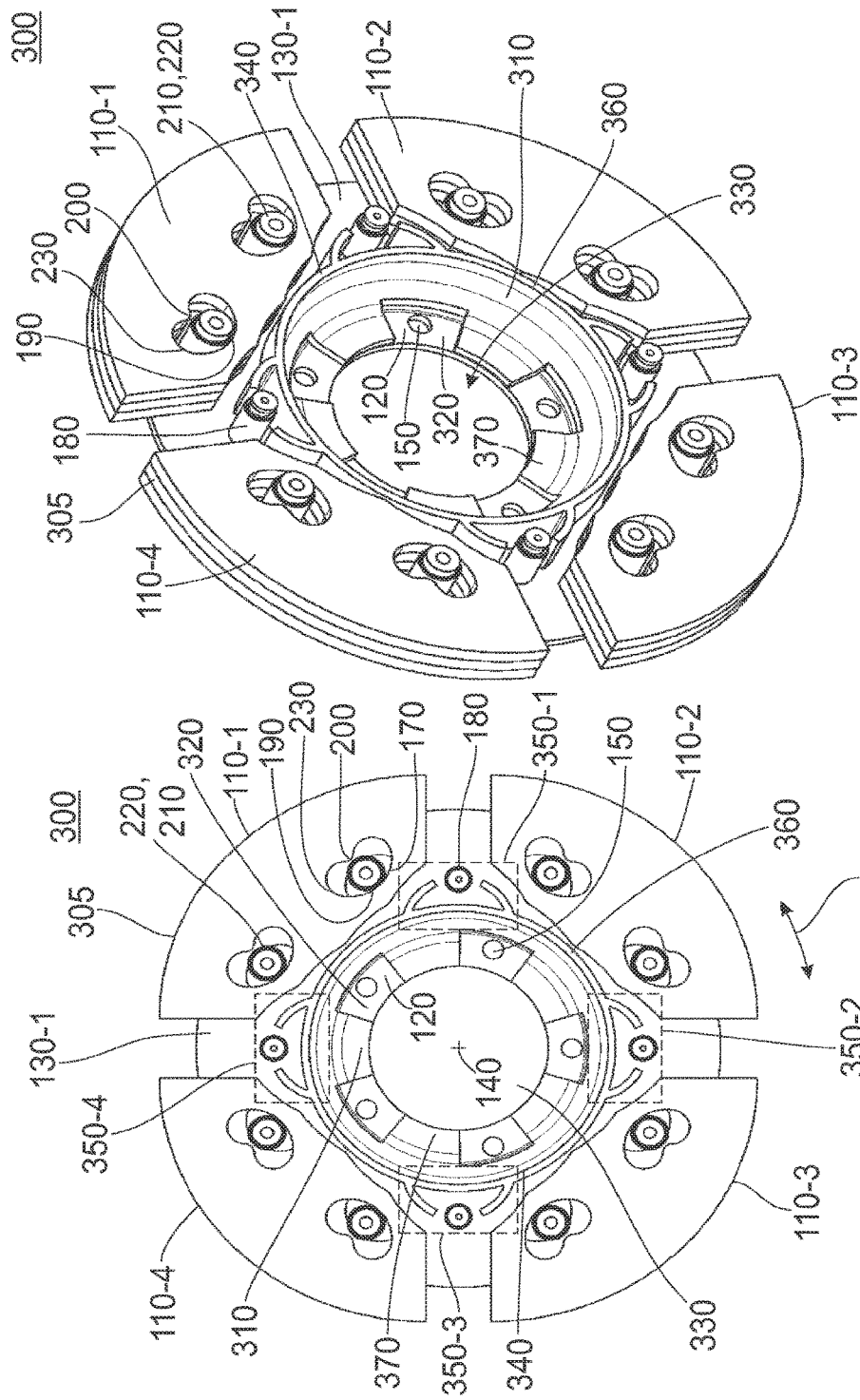

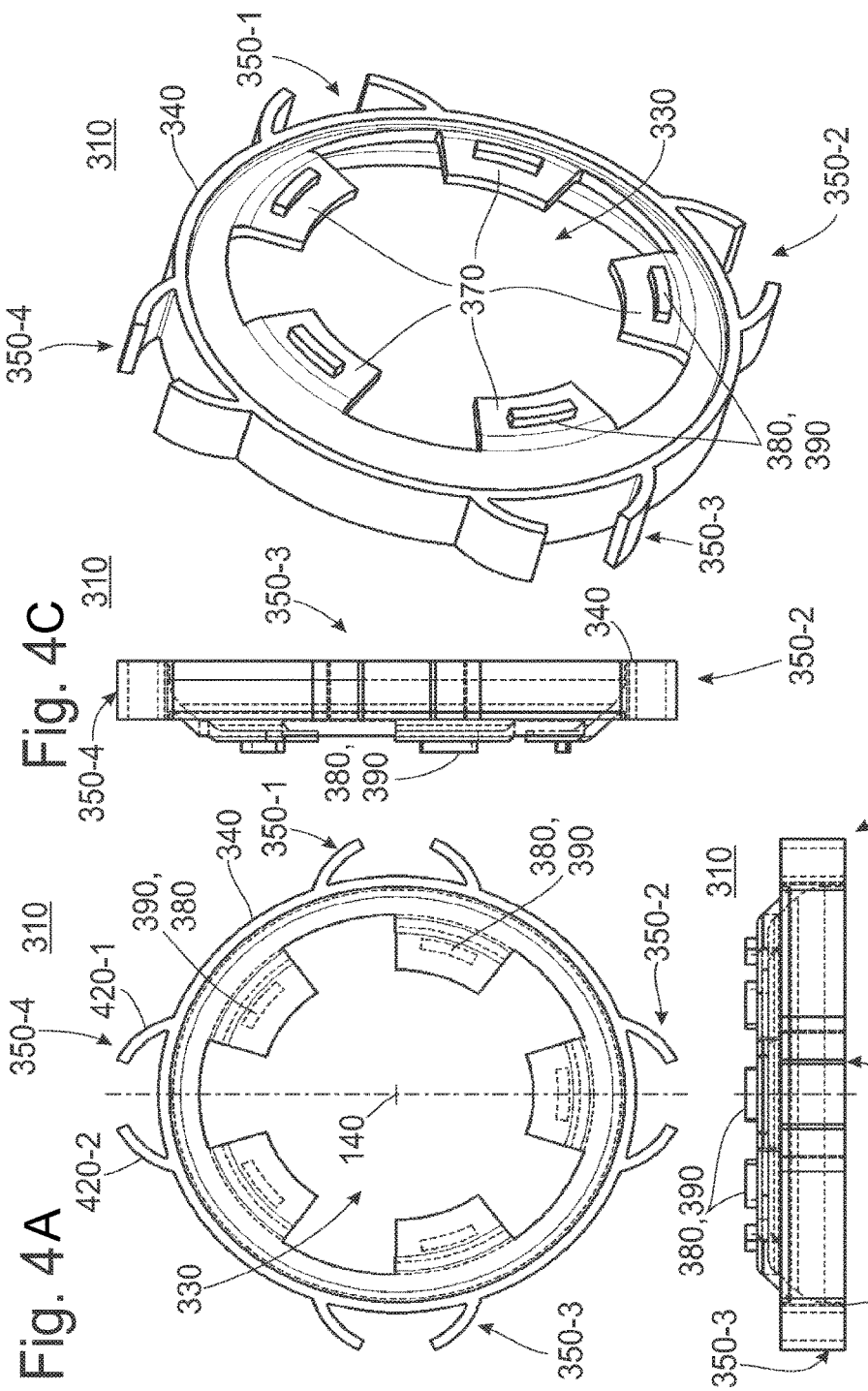

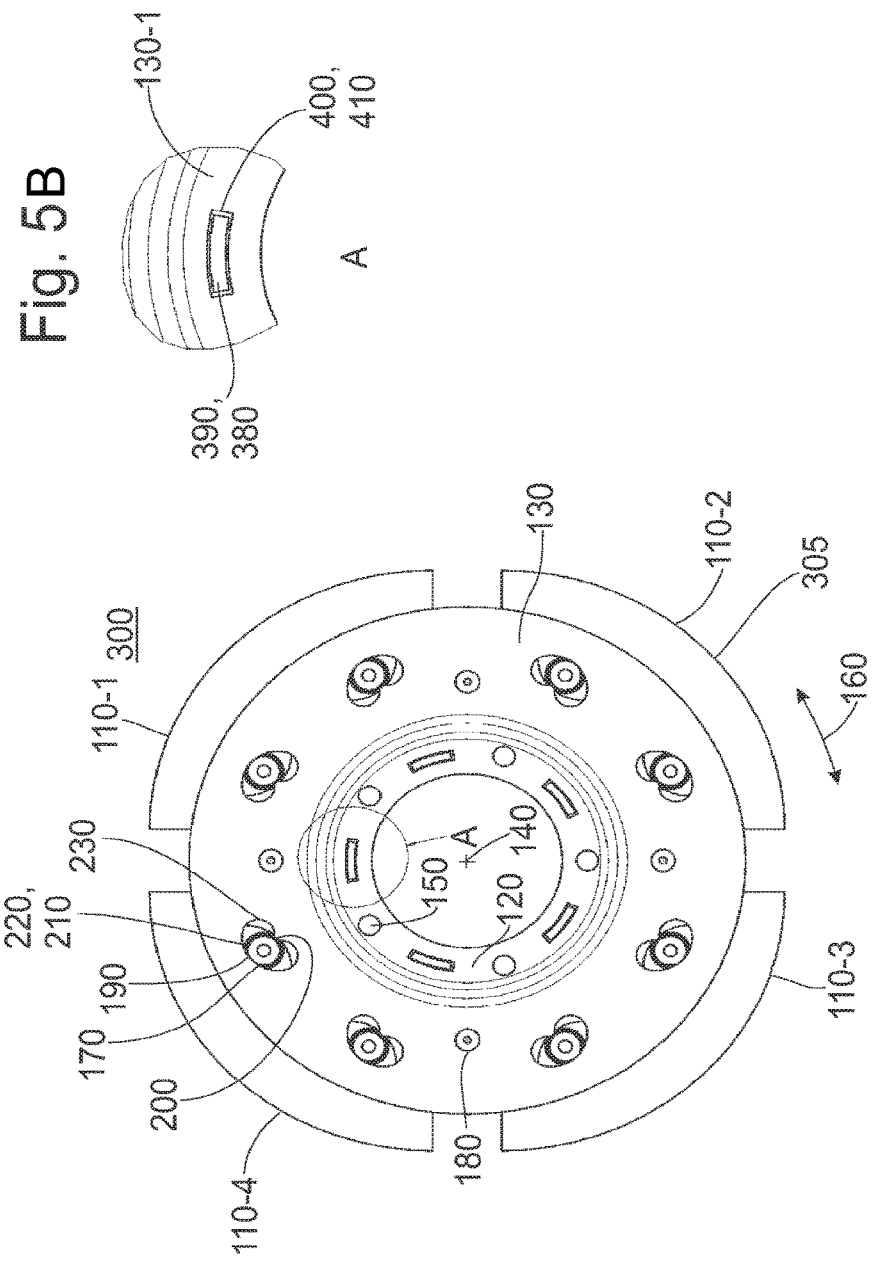

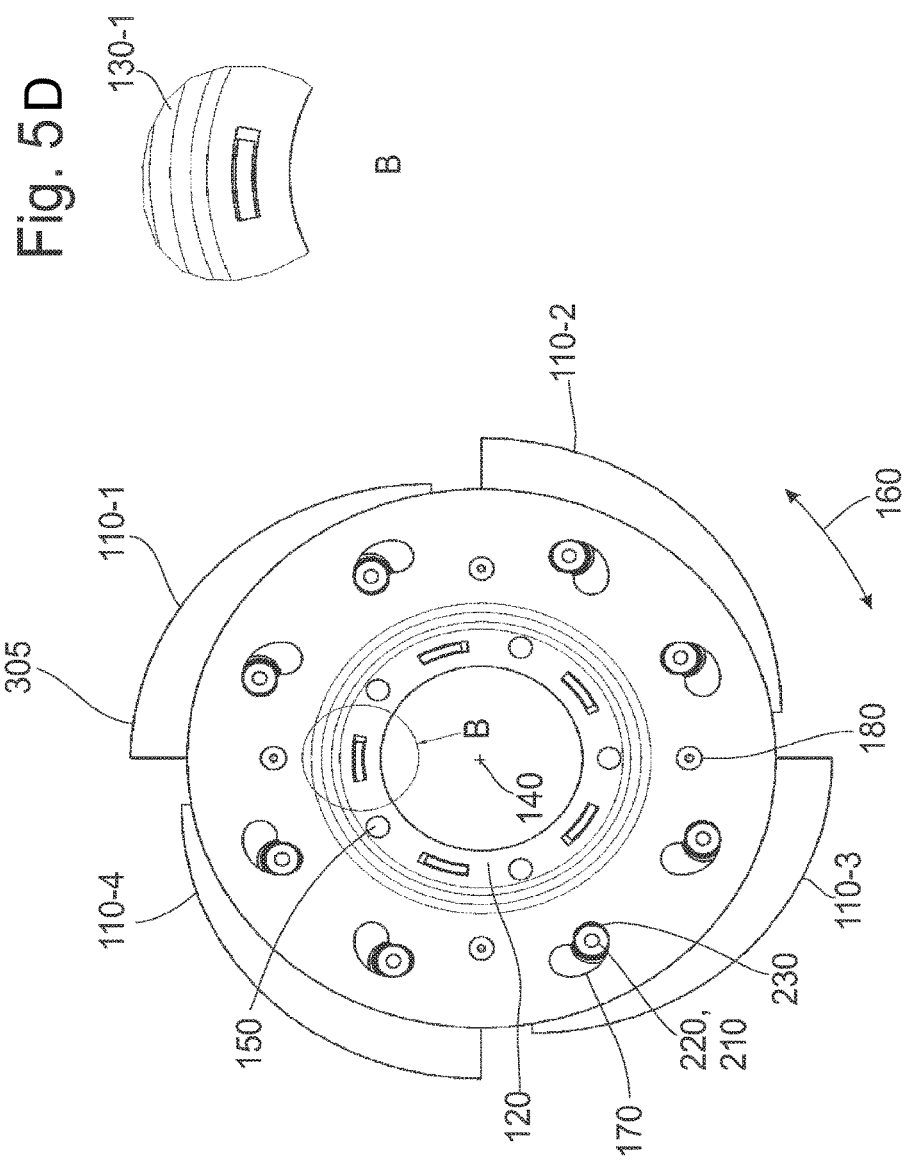

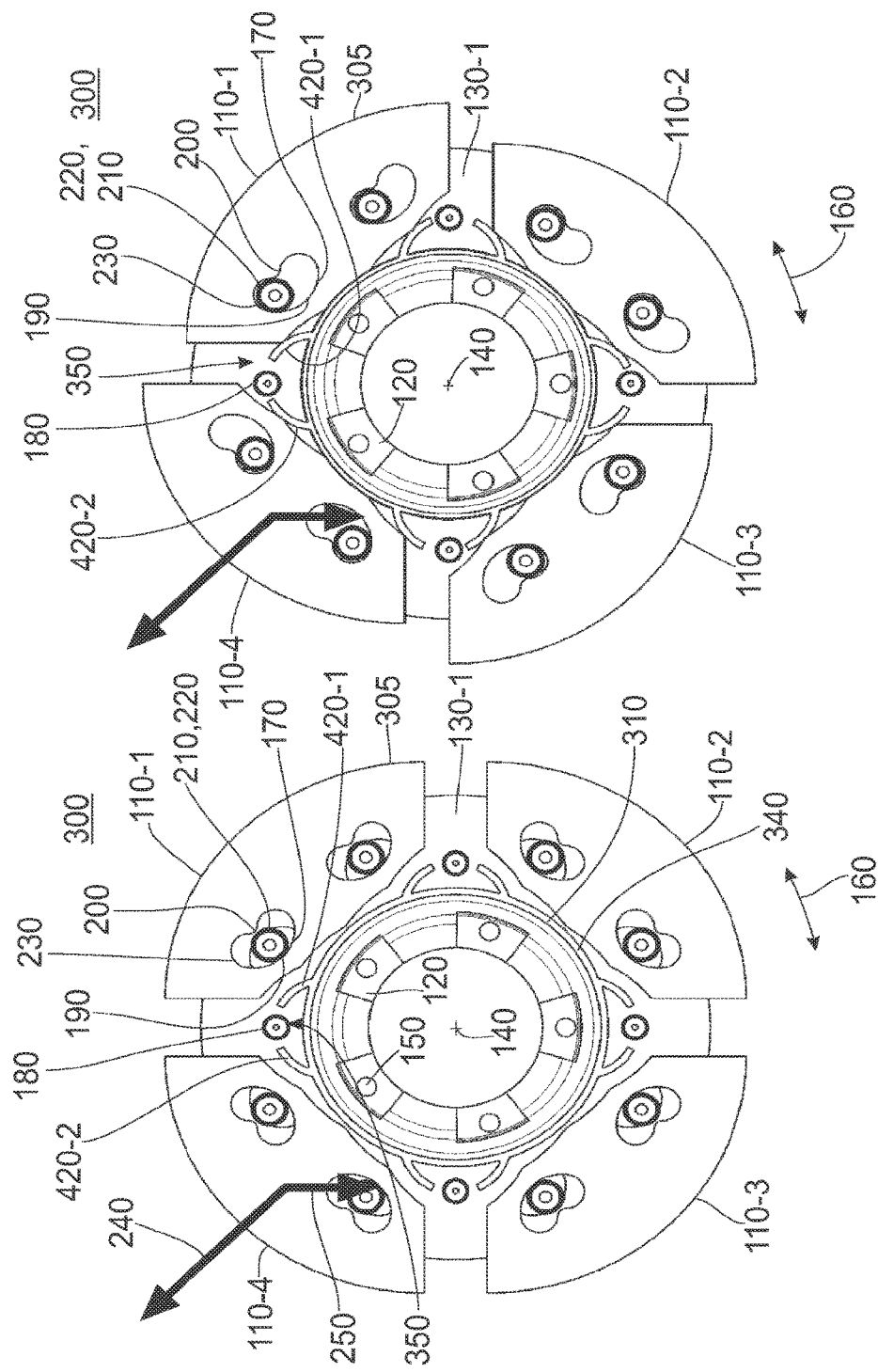

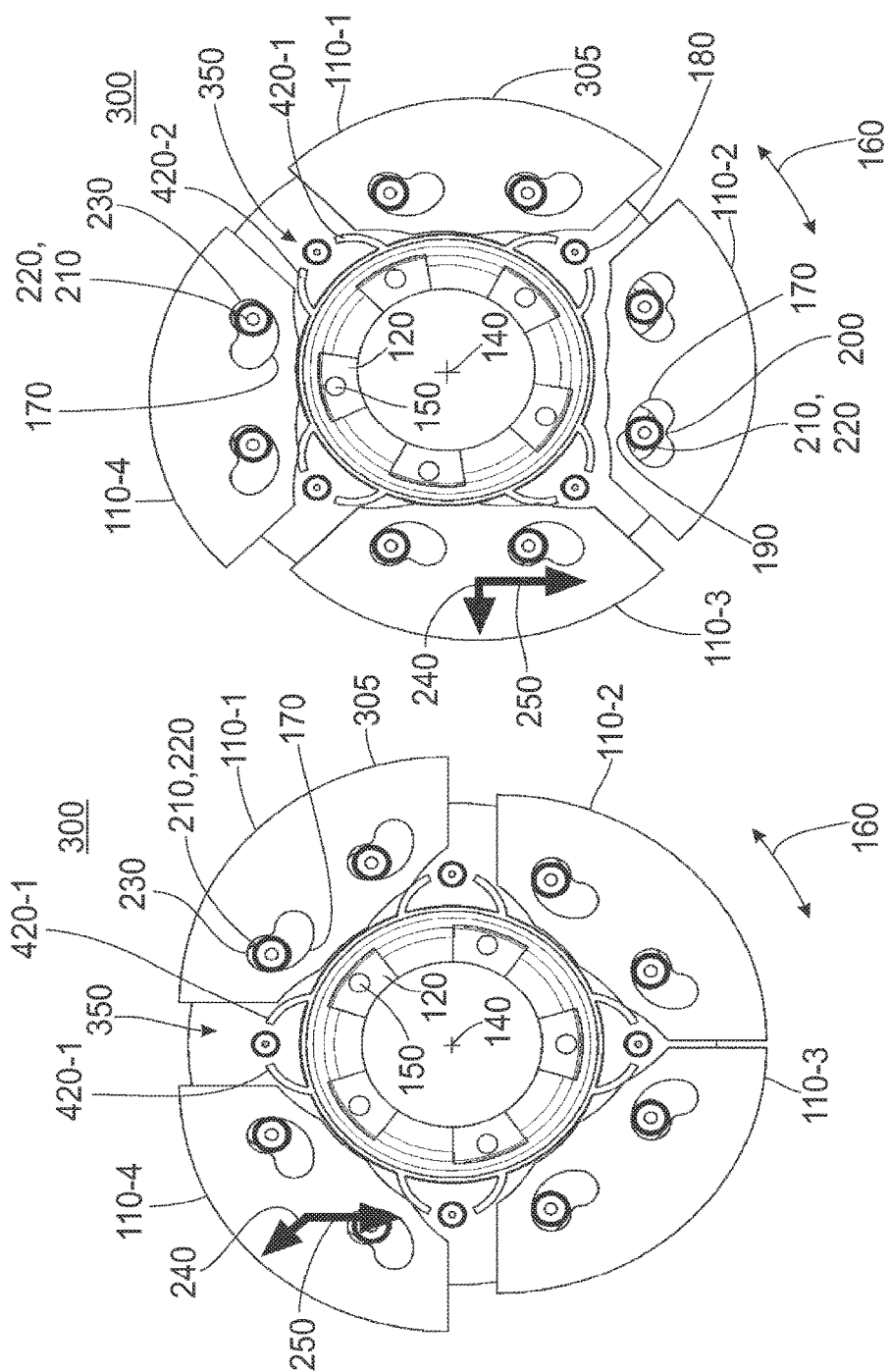

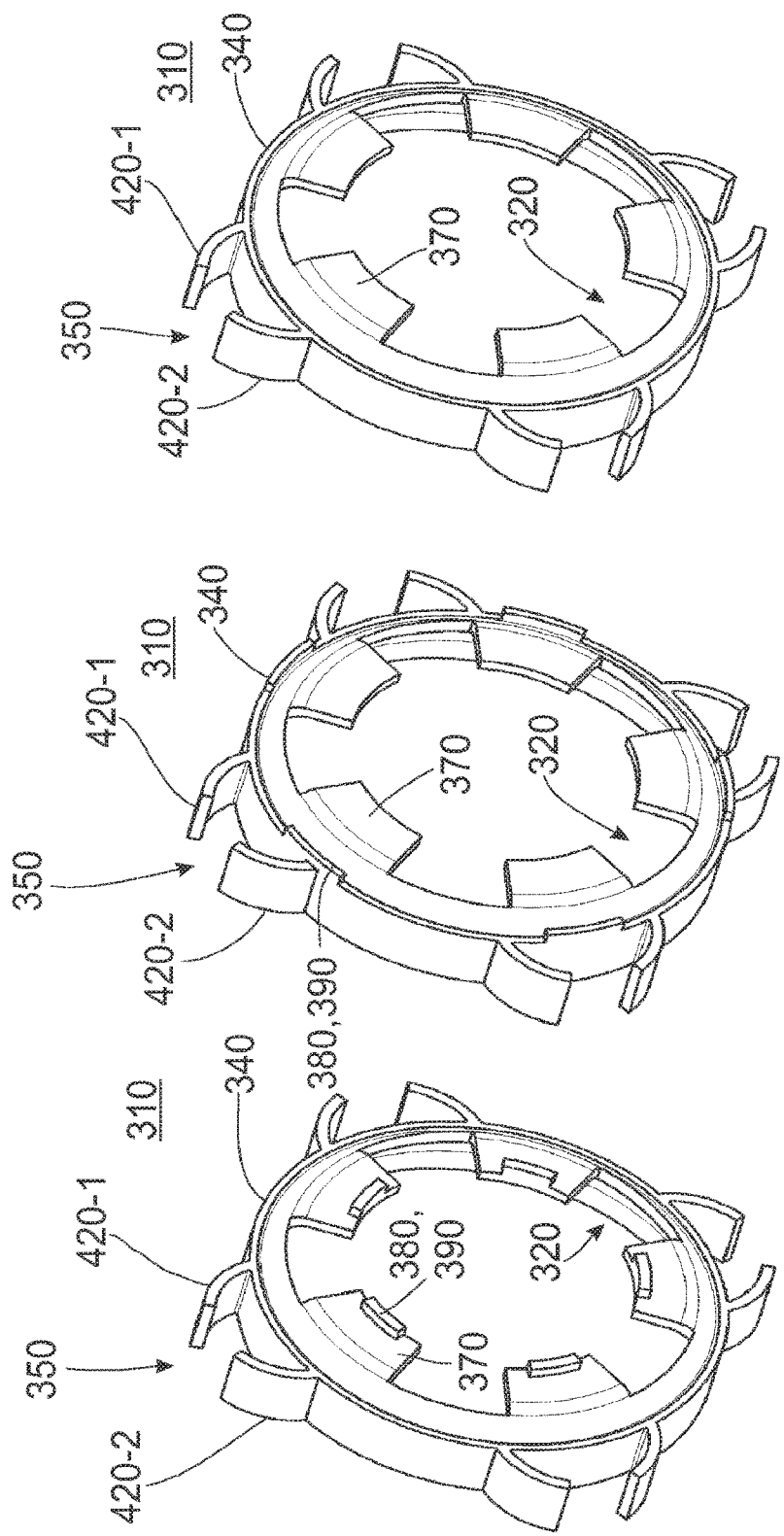

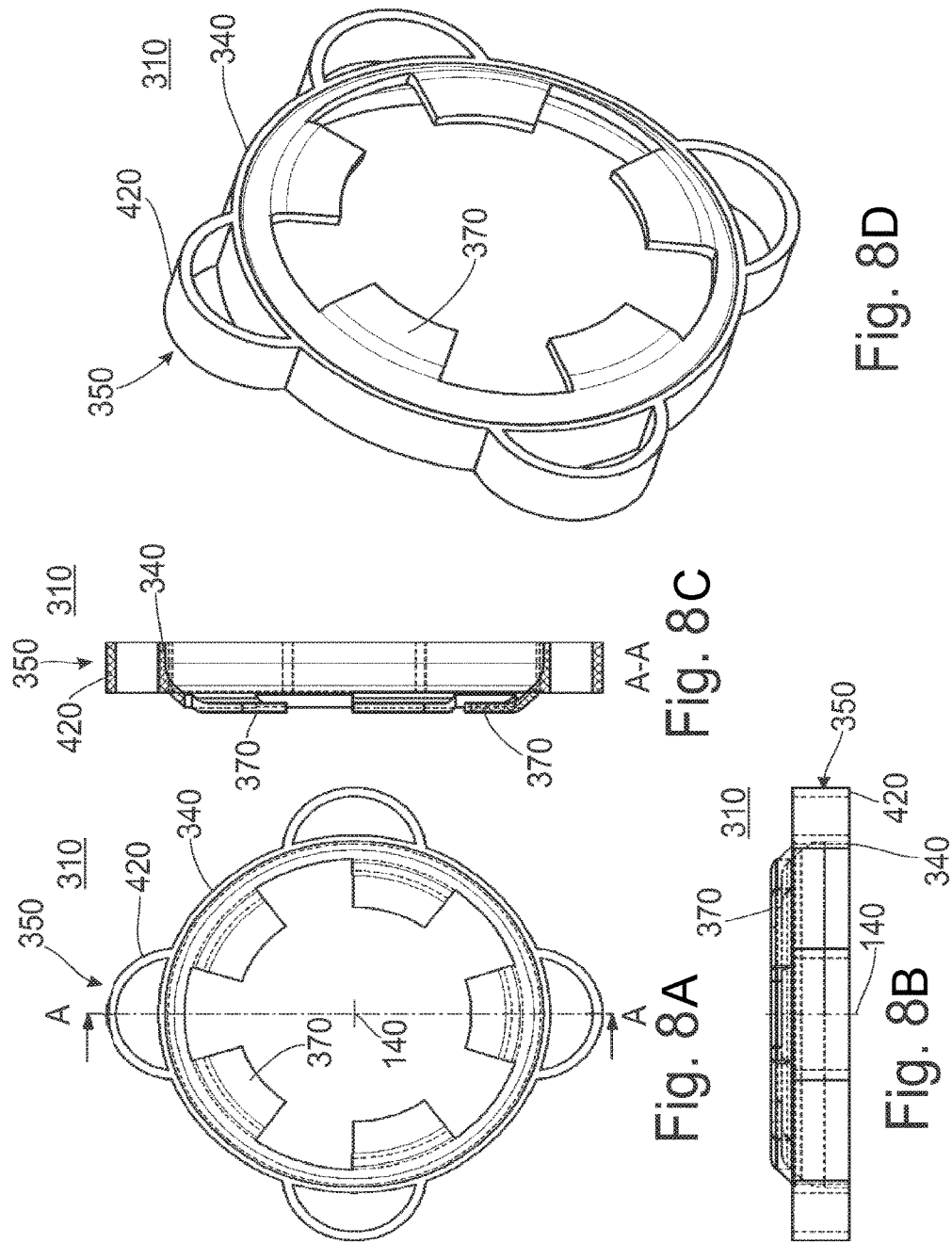

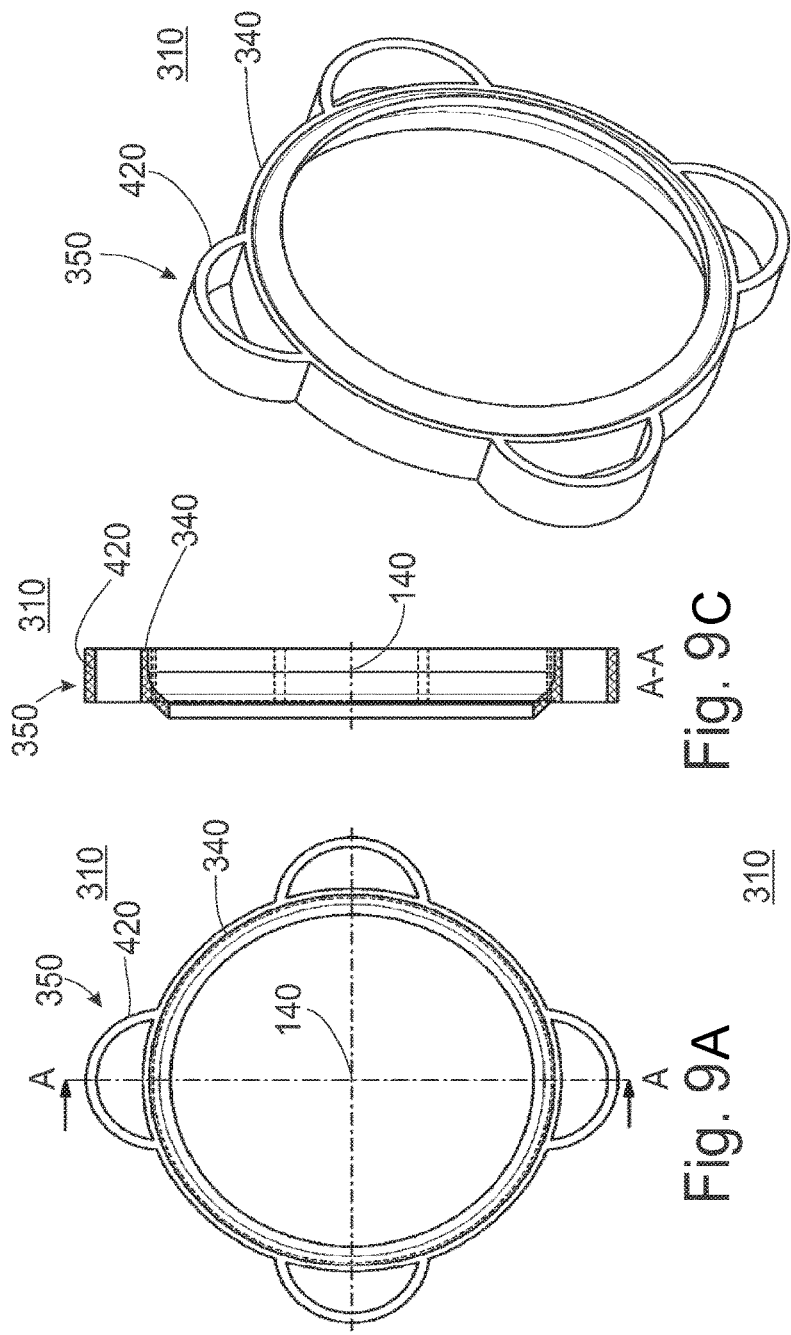

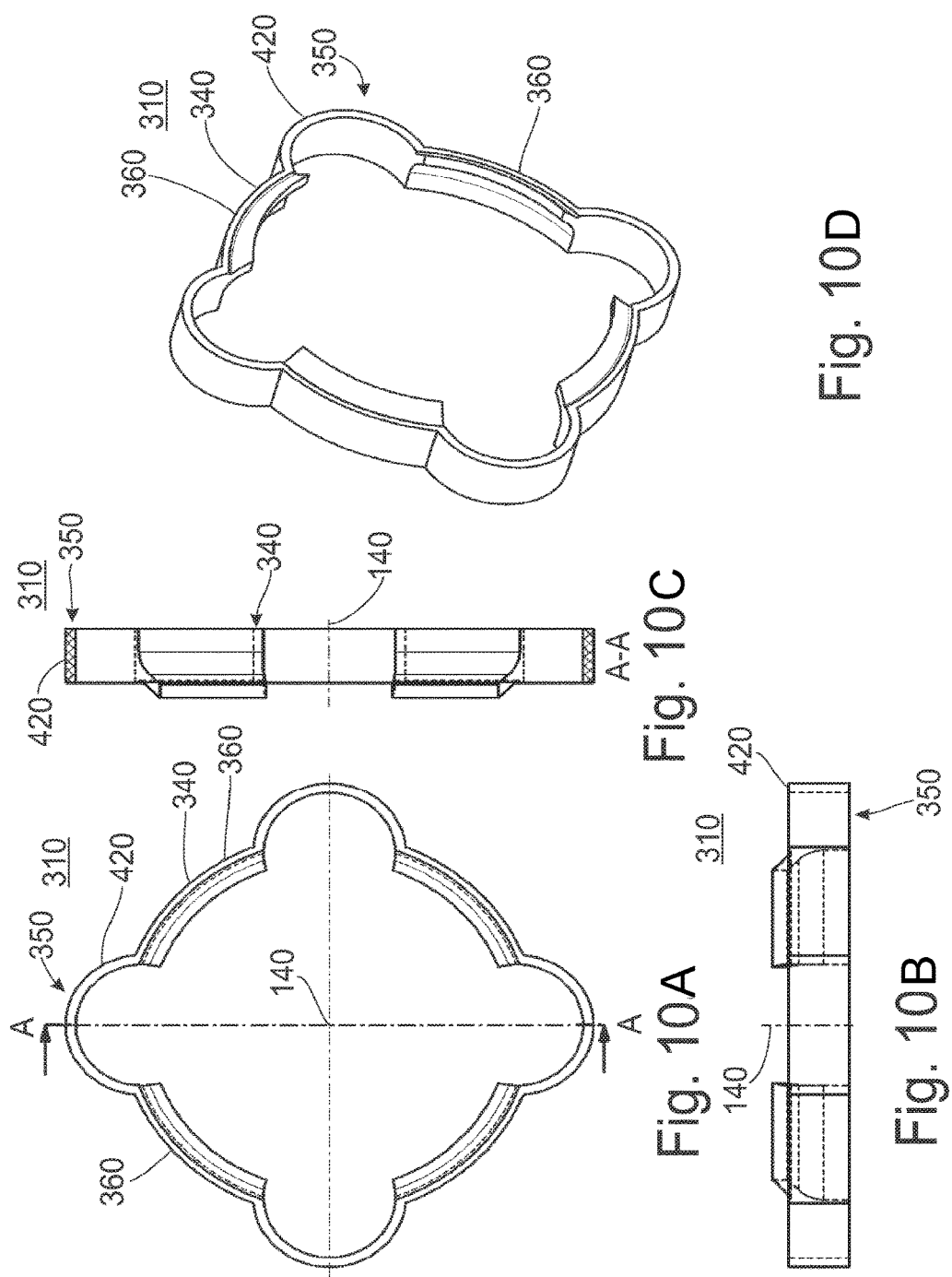

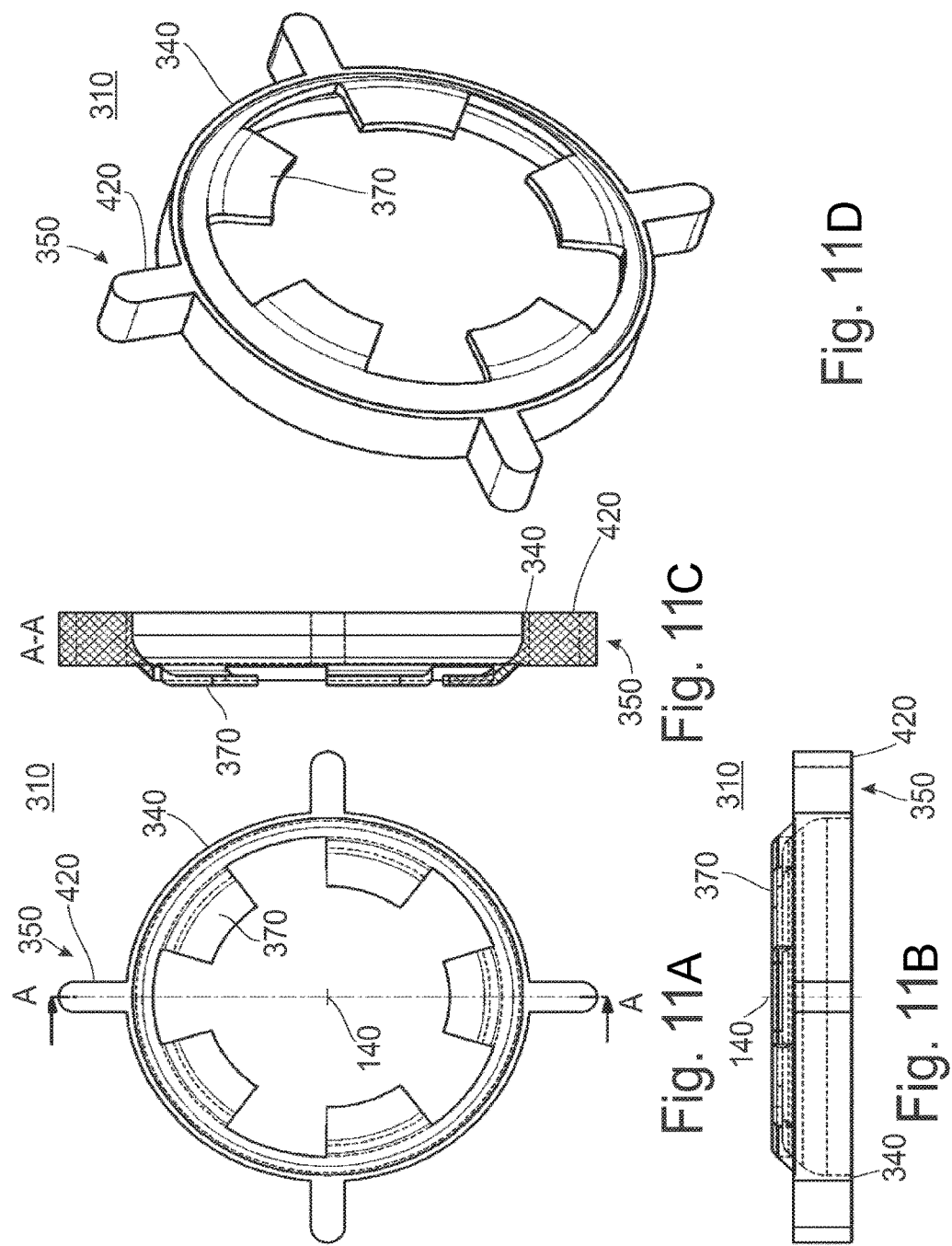

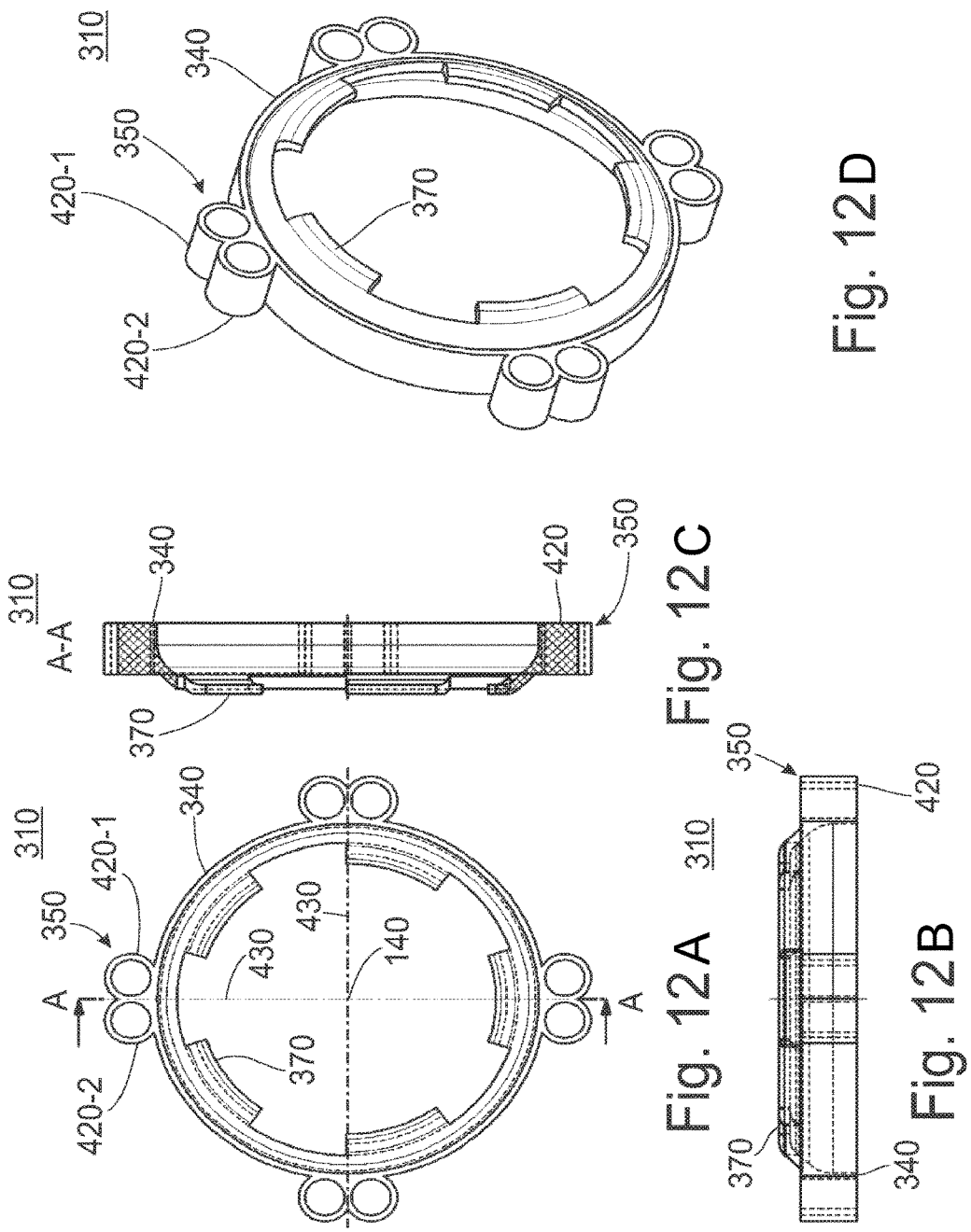

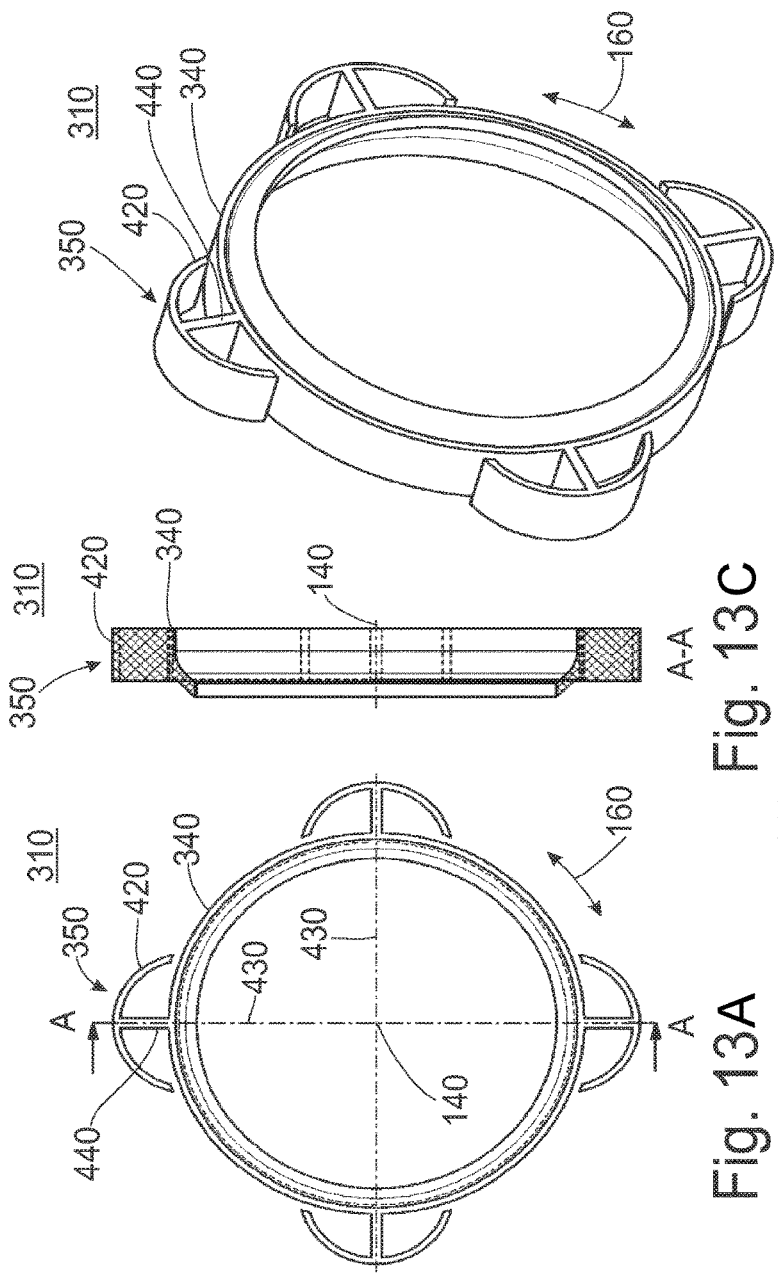
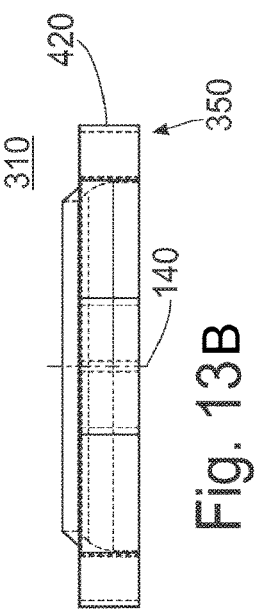

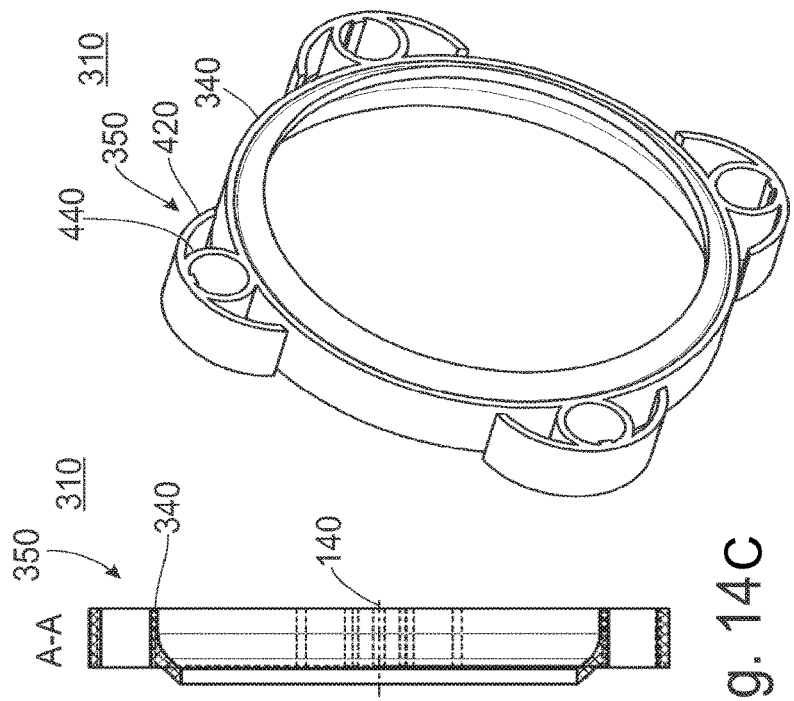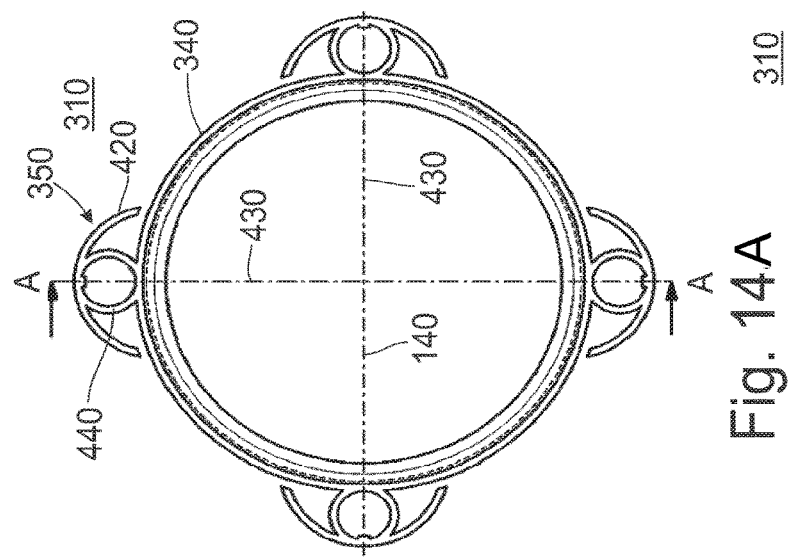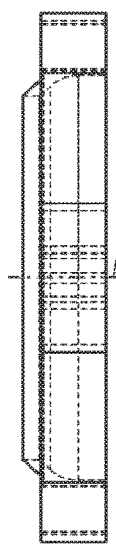

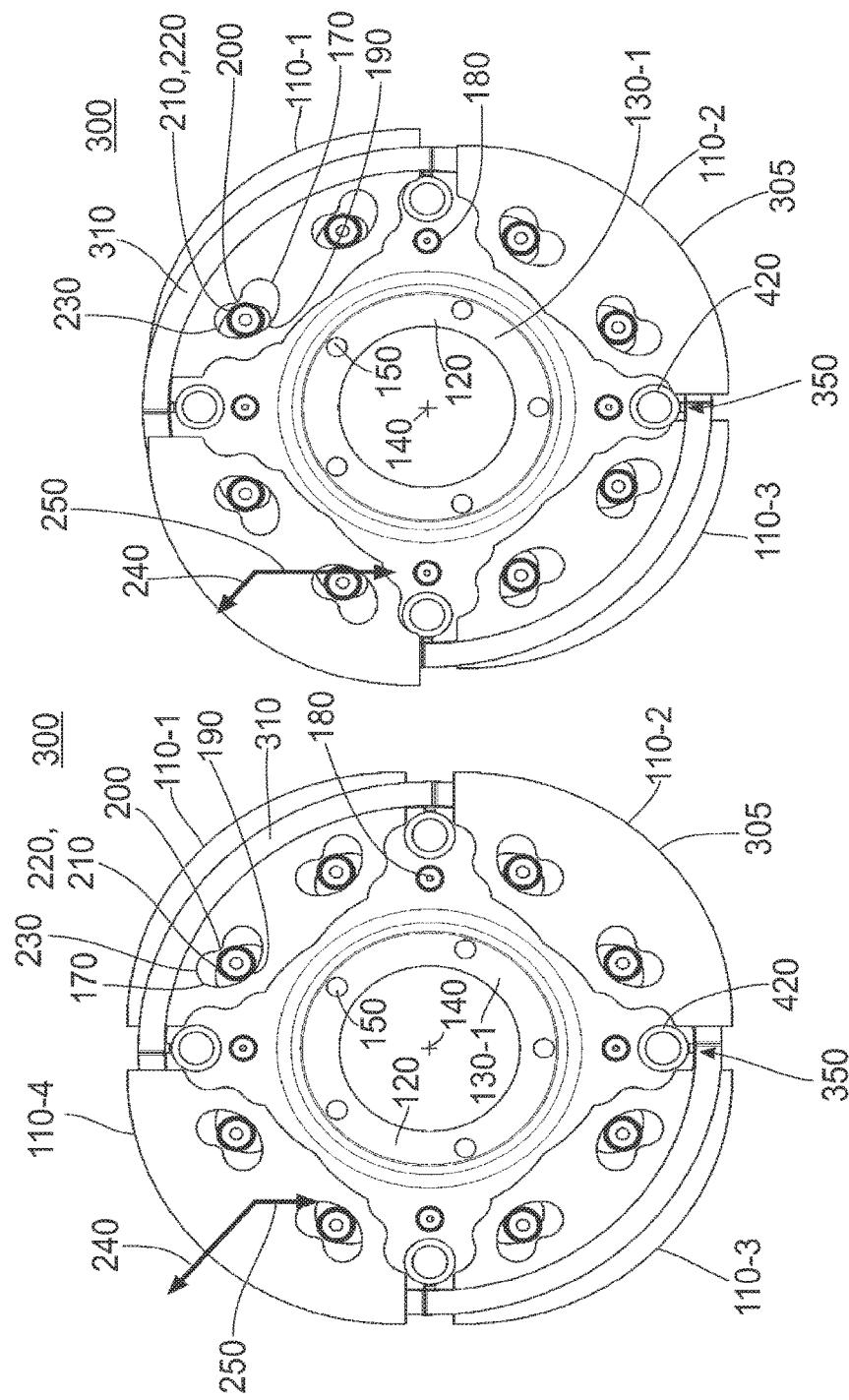

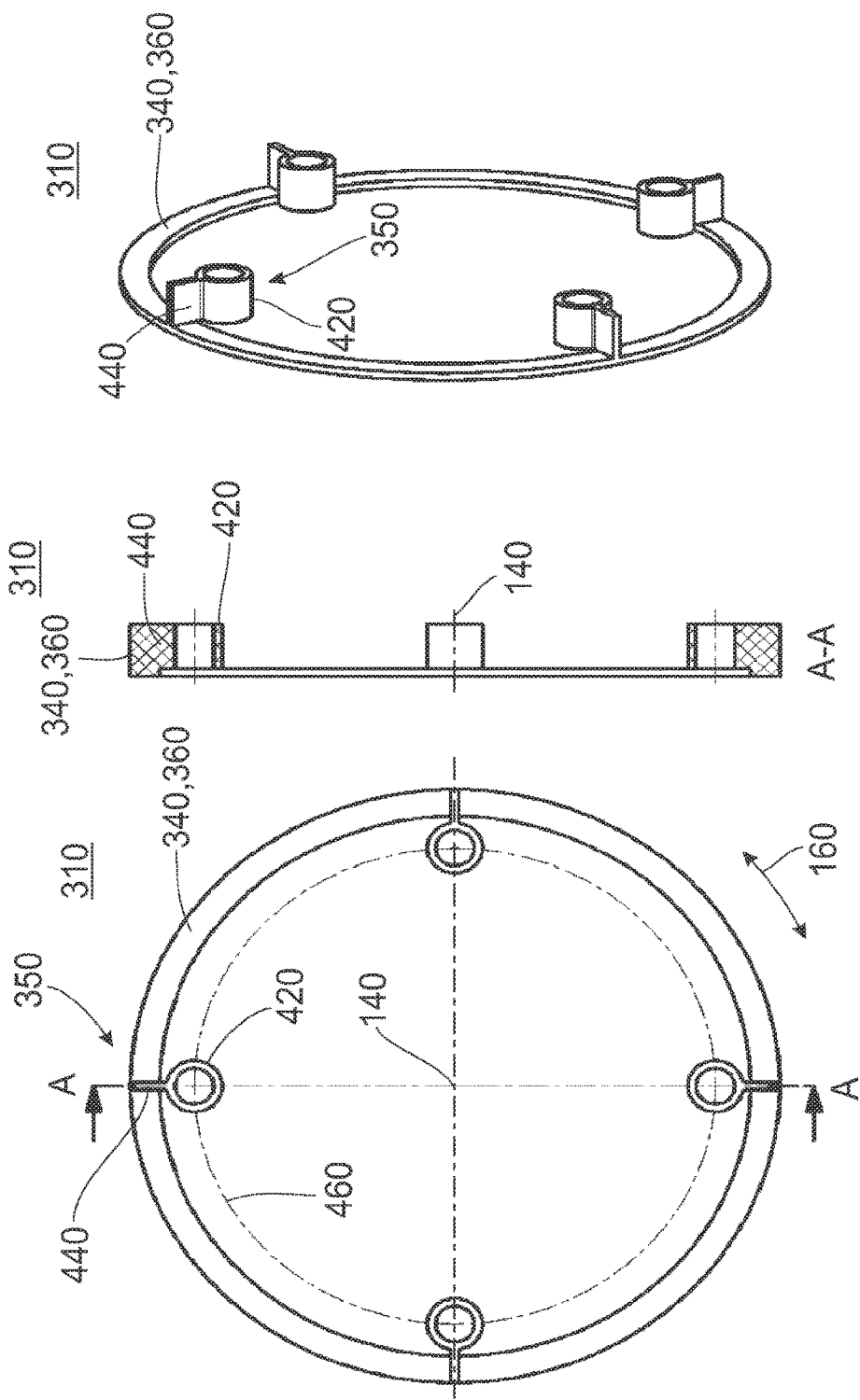

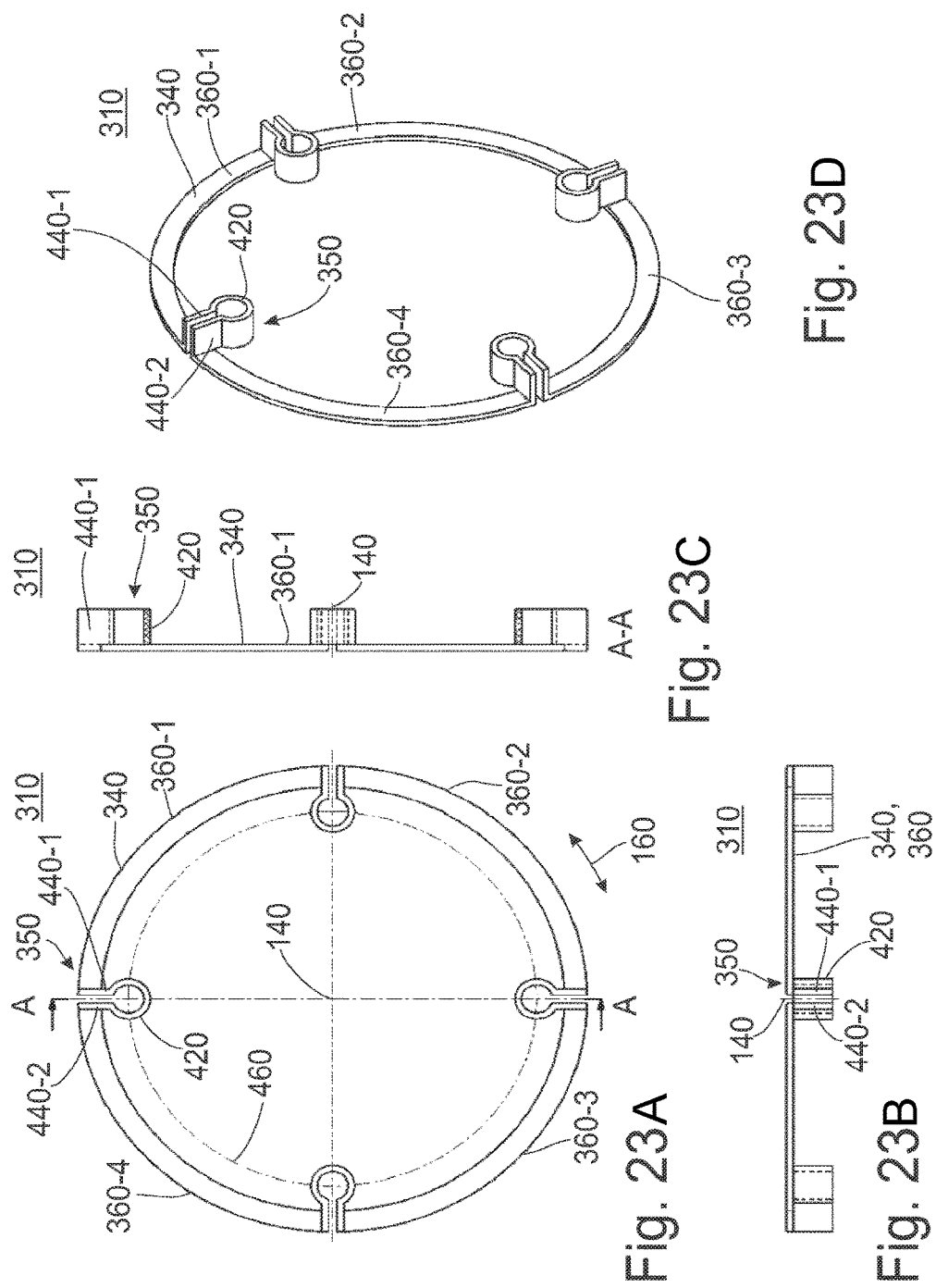

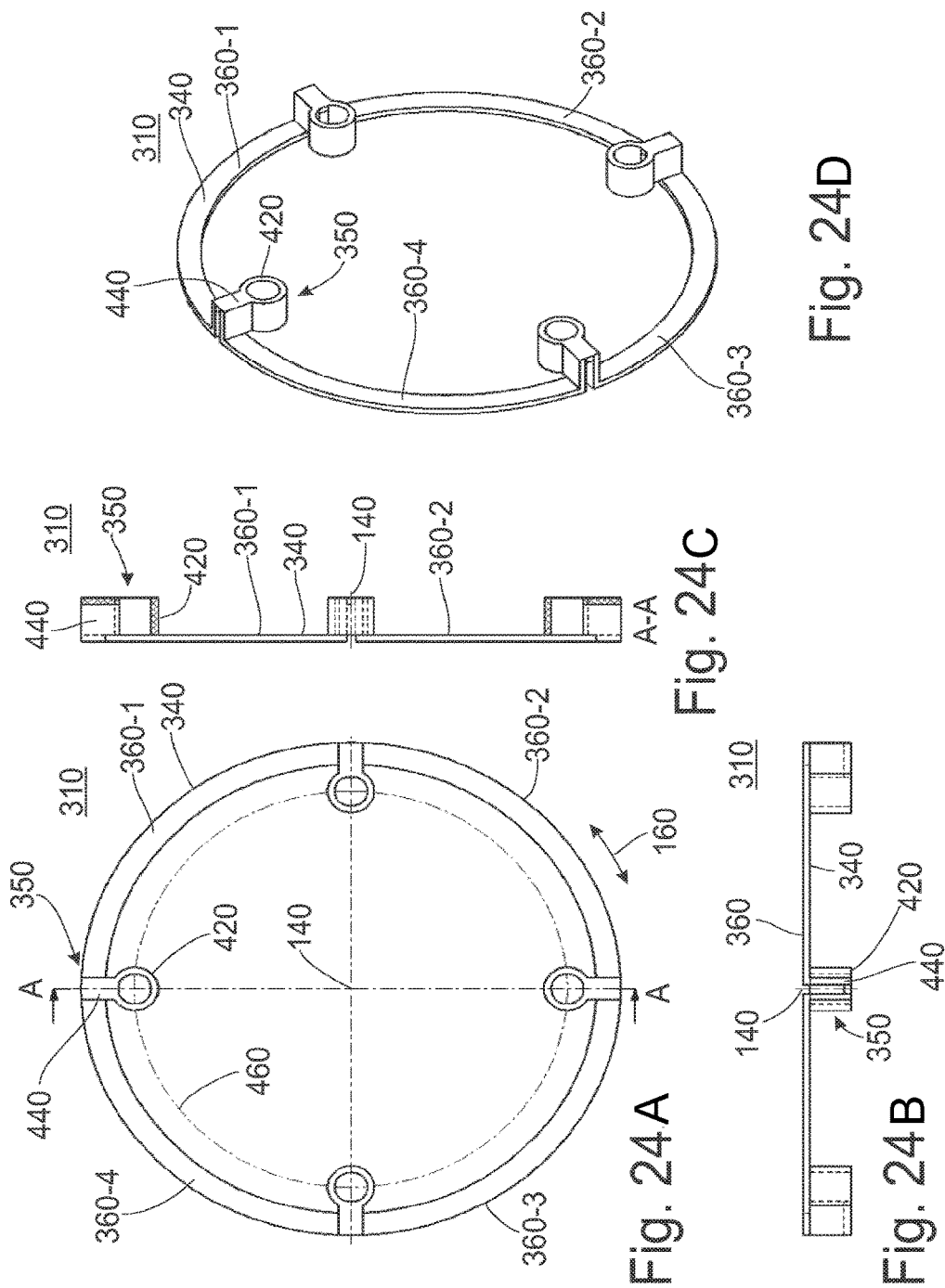

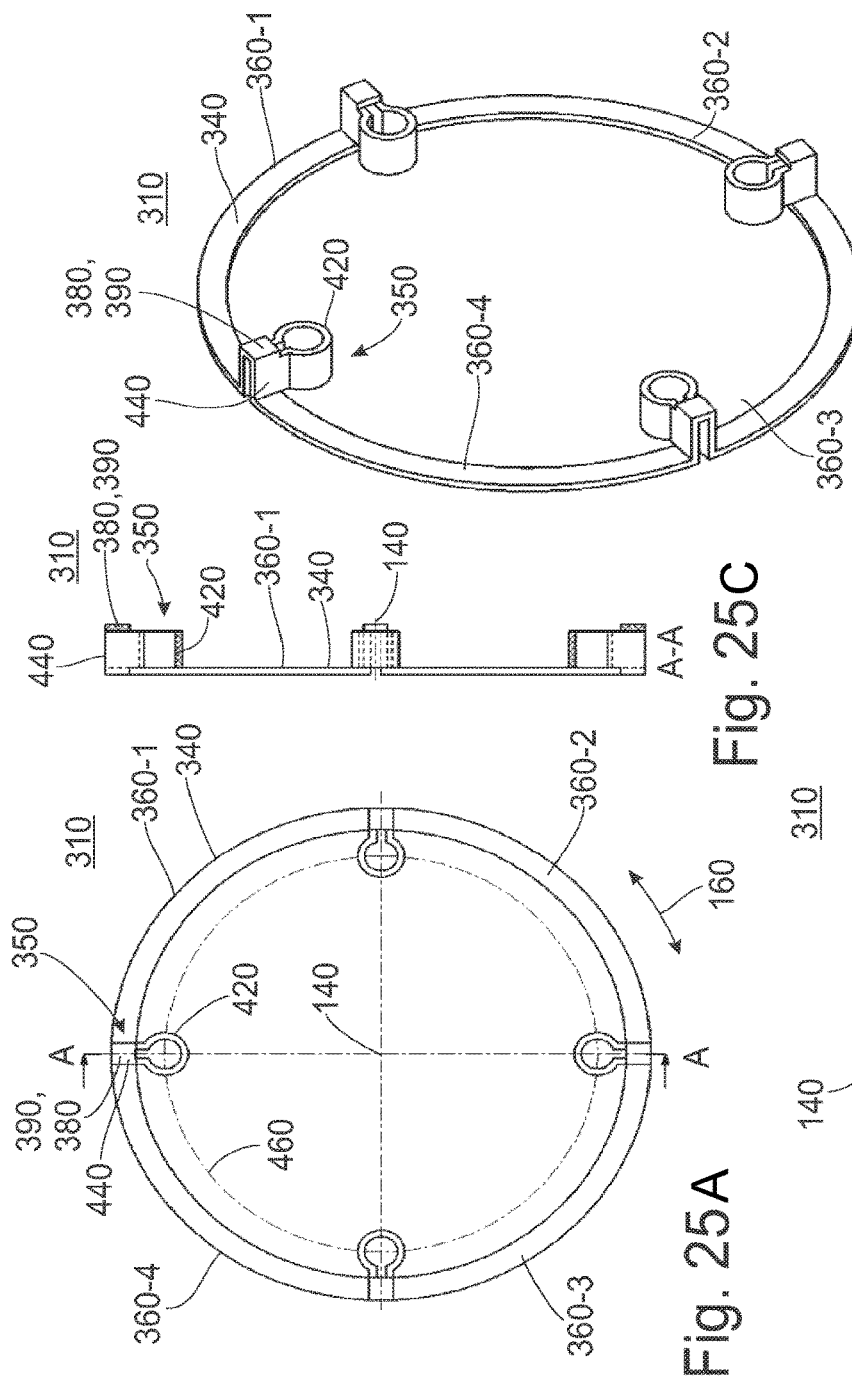

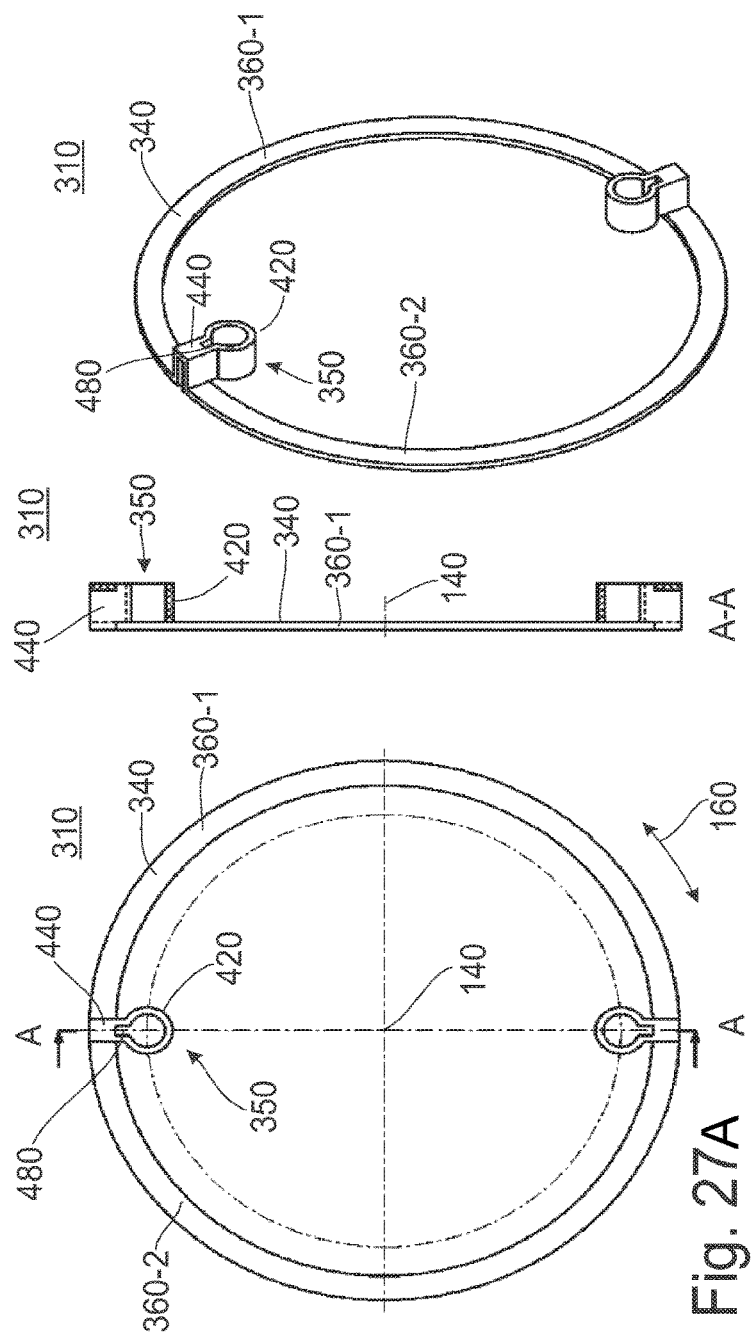

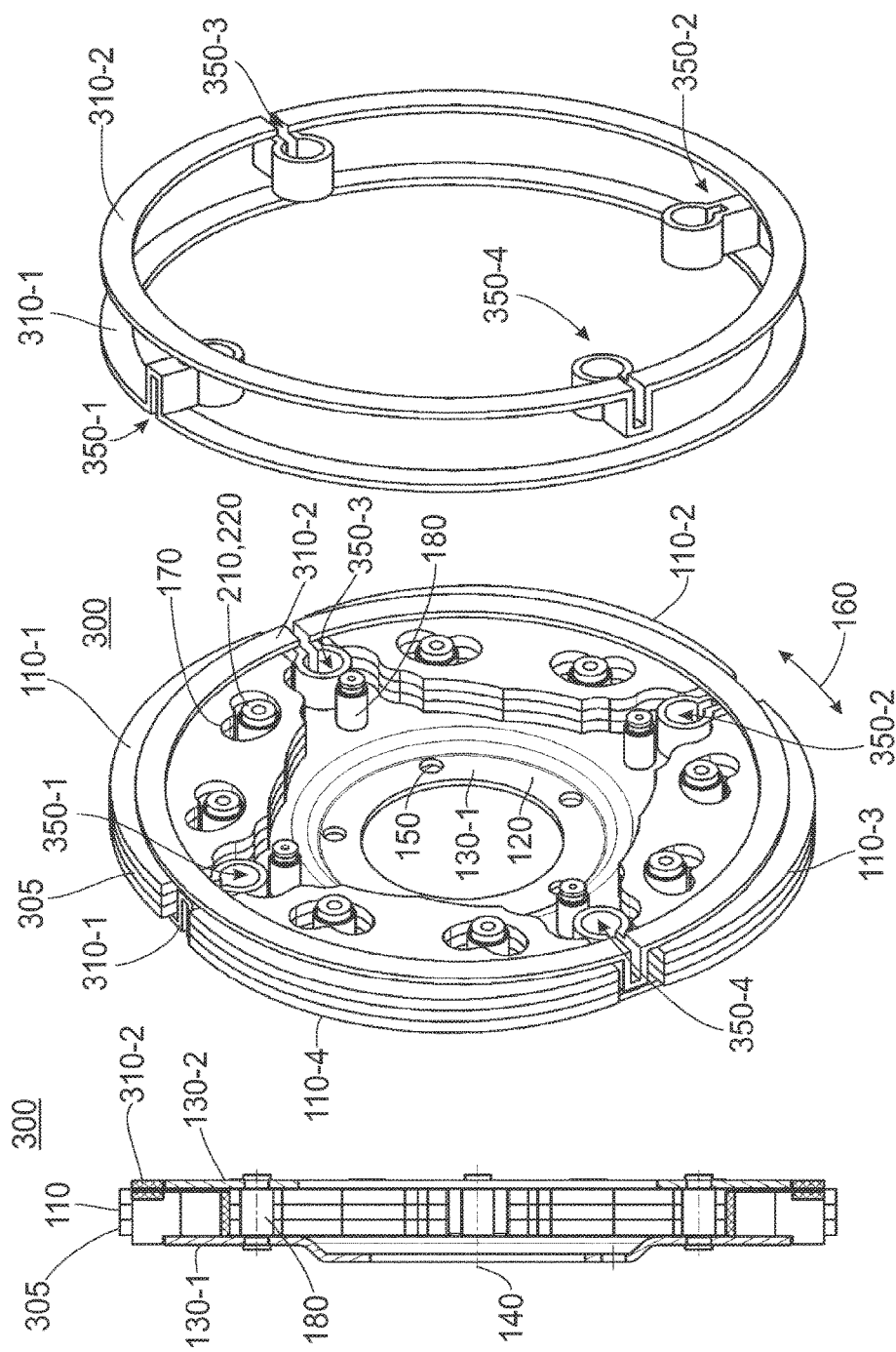

ABSORBER-TYPE VIBRATION DAMPER

PRIORITY CLAIM

This application is a divisional application of Ser. No. 14/772,442; filed Sep. 3, 2015, which is a U.S. national stage of application No. PCT/EP2014/053206, filed on Feb. 19, 2014. Priority is claimed on the following application: Country: Germany, Application No.: 10 2013 204 711.8, Filed: Mar. 18, 2013, the content of which is/are incorporated herein by reference in its entirety.

FIELD OF THE INVENTION

The present invention relates to a tuned mass vibration damper such as can be used, for example, in a drivetrain of a motor vehicle, i.e., for example, within the framework of a start-up element of a motor vehicle, for damping a vibration component of a rotational movement.

BACKGROUND OF THE INVENTION

In many areas of machine, plant and automotive engineering, rotational irregularities occur when rotational movements are transmitted. These rotational irregularities can result, for example, when a rotational movement of this type is coupled into a shaft or also due to changes in the amount of energy or torque taken from the shaft and the rotational movement of the shaft.

An example of this is drivetrains of motor vehicles, i.e., for example, drivetrains of passenger cars, trucks or other utility vehicles, in which an internal combustion engine is used as drive motor. Because of its principle of operation, an engine of this kind often has discontinuous torque peaks which are coupled into its crankshaft or into another corresponding shaft and can possibly lead to deviations with respect to a timing of the torque and/or speed. Rotational irregularities of this kind can manifest themselves as vibration components of a rotational movement, for example.

Vibration dampers are used to keep such rotational irregularities or vibration components of a rotational movement away from other components of a complex mechanical system like a drivetrain of a motor vehicle. These vibration dampers are intended to eliminate the vibration components or at least reduce the amplitude thereof. Thus, for example, in a drivetrain of a motor vehicle within the framework of a start-up element which is typically integrated between the internal combustion engine and a downstream transmission in order to allow continued running of the internal combustion engine also when the vehicle is stopped, during which the transmission input shaft is likewise stationary.

Energy accumulator elements are often employed in vibration dampers. These energy accumulator elements allow temporary absorption and, therefore, buffering of energy peaks of the rotational movement which are then coupled into the rotational movement again at a later time. In many torsional vibration dampers, the energy accumulators which are often configured as spring elements are connected in the actual torque path, i.e., the path of rotational movement, such that the rotational movement is transferred via the energy accumulator elements.

In contrast, in tuned mass vibration dampers no transmission of rotational movement takes place via the energy accumulator elements. These tuned mass vibration dampers typically comprise one or more damper masses which can carry out oscillations in a force field to damp an unwanted vibration component of the rotational movement. The force field is formed by the forces acting on the damper masses. In particular, these forces also include a centrifugal force in addition to the weight force.

Sharply diverging requirements are sometimes imposed on corresponding tuned mass vibration dampers and the components making up the latter. Foremost in this respect, apart from functioning as efficiently as possible, are, for example, available installation space, a production in the simplest possible manner and lowest possible noise nuisance, to name only a few aspects. The components surrounding the tuned mass vibration damper typically allow only a limited installation space to be taken up by the tuned mass vibration damper in all operating states. It should also be producible in the simplest possible manner. Noise can also occur in tuned mass vibration dampers because of operation, for example, due to changes in the forces acting on the damper masses. As a result of the latter, it can happen that the damper masses of the tuned mass vibration damper are no longer guided with respect to the movement thereof substantially by centrifugal forces, but rather by the weight force acting upon them, for example, when a speed of the rotational movement and, therefore, the influence of the centrifugal forces decreases. Noises can occur when the damper masses collide with each other or with other components, for example, with the ends of their guide paths.

These noises, which are frequently metallic, can be perceived by the driver and the passengers of the motor vehicle as well as outside of the motor vehicle. These noises are frequently perceived by persons as annoying because the occurrence of these metallic noises is unexpected. For this reason, developers have tried to reduce noise generation in a tuned mass vibration damper.

DE 10 2011 100 895 A1 is directed to a centrifugal pendulum absorber with a pendulum flange that is rotatable around an axis of rotation and with a plurality of pendulum masses distributed along the circumference on both sides of the pendulum flange. Two axially opposed pendulum masses are connected to one another in each instance by connection means extending through the pendulum flange to form pairs of pendulum masses. In order to achieve an elastic limiting of the pendulum masses without resorting to stop bumpers and cutouts made for the latter in the pendulum flange, an elastic limiting of an oscillating movement of the pendulum masses is carried out in this case by means of an annular spring that is integrated radially inside of the pendulum masses.

U.S. Pat. No. 6,382,050 relates to a vibration damping device with a deflection mass arrangement which is arranged at a base body which is rotatable around an axis of rotation having at least one deflection mass and a deflection path which is associated with the at least one deflection mass and along which the deflection mass can move during the rotation of the base body around the axis of rotation. The deflection path has a vertex area, deflection areas on both sides of the vertex area, the distance of these deflection areas from the axis of rotation decreasing from the vertex area to the end areas of the deflection areas, and a braking arrangement which is operative in the end areas of the deflection areas and by means of which the movement of the at least one deflection mass can be gradually decelerated when approaching or reaching a respective end region of a deflection path.

This should be carried out through the simplest possible constructional means so as to facilitate as far as possible not only the availability of the necessary component parts but also the assembly thereof in the form of the tuned mass vibration damper and the components comprising the latter.

Therefore, there is a need for a better compromise between a functioning of a tuned mass vibration damper, an efficient utilization of installation space, reduced noise and the simplest possible production of a tuned mass vibration damper.

SUMMARY OF THE INVENTION

A tuned mass vibration damper according to an embodiment example for damping a vibration component of a rotational movement which can be used, for example, in a drivetrain of a motor vehicle comprises at least three damper masses which are configured to carry out an oscillation depending on the rotational movement in order to damp the vibration component of the rotational movement. It further comprises at least one guide component part which is configured to movably guide the at least three damper masses such that the damper masses are arranged so as to be offset along a circumferential direction perpendicular to an axis of rotation of the rotational movement and can carry out the oscillation. Beyond this, a tuned mass vibration damper according to an embodiment example comprises a damping component part which is rotatable around the axis of rotation of the rotational movement opposite to the at least one guide component part and which comprises a support structure and at least two damping structures connected to the support structure, which damping structures extend radially proceeding from the support structure and are constructed and arranged such that one damping structure of the at least two damping structures when making contact with one of two adjacent damper masses prevents a contact of the two adjacent damper masses through an elastic deformation. Alternatively or additionally, the damping component part and damping structures thereof can also be constructed in such a way that when a damper mass of the at least three damper masses makes contact with a damping structure of the at least two damping structures, the damping component part is rotatable around the axis of rotation such that a further damping structure of the at least two damping structures makes contact with a further damper mass of the at least three damper masses.

Accordingly, a tuned mass vibration damper according to an embodiment example is based on the insight that the aforementioned compromise can be improved by using a damping component part of the type described above. Due to the fact that this damping component part is configured to be rotatable, it exerts less of an influence on the oscillations of the damper masses under many operating conditions so that the functioning of the tuned mass vibration damper is barely affected. As will be shown in the following description, the damping component part can be integrated in a space-saving manner so as to take up only a slight additional installation space. Moreover, due to the fact that the two adjacent damper masses are prevented from touching by the damping component part, noise development that is frequently perceived as unpleasant is reduced. The additional or alternative effect of the damping component part, whereby precisely as a result of one of its damping structures making contact with a damper mass this damping component part is rotatable or is rotated such that another one of its damping structures makes contact with another damper mass, can lead in this case to a limiting of the duration of coupling of damper masses with one another. In this way, it can be possible optionally to prevent a collision of the further damper mass so that annoying noises can be prevented as far as possible or at least reduced. Depending on the specific implementation of an embodiment example and possibly depending on the intensity of contact, a deformation of the damping structure and/or of the further damping structure can result. Additionally or alternatively, a movement of the further damper mass can also possibly be brought about by the further damper mass making contact with the further damping structure. Owing to the fact that the damping component part, in that it has at least two damping structures, can interact with more than only two damper masses, this can be achieved by technical means which are simpler compared to many constructions and which also negligibly complicate the assembly of the tuned mass vibration damper.

Accordingly, in a tuned mass vibration damper according to an embodiment example the damping structures can extend radially between two adjacent damper masses. In other words, in this case there exists a pitch circle around the axis of rotation with a radius such that exactly one damping structure of the damping component part is located along the pitch circle between the two adjacent damper masses. For example, depending on specific implementation or on the operating situation, the relevant damping structure can possibly also be arranged or located only partially between the two relevant damper masses.

Optionally, in a tuned mass vibration damper according to an embodiment example the damping structures can comprise at least one damping portion, respectively, which is constructed and arranged to make contact with at least one of the adjacent damper masses and, in doing so, to elastically deform. By elastic deformation is meant a deformation that is detectable macroscopically, i.e., detectable as such by the naked eye. Thus deformations which occur inevitably substantially also when contact is made between materials which do not count as elastically deformable are not taken into account. Accordingly, depending on the embodiment example, an elastic deformation is a deformation in which there is a dimensional change of at least 0.1%, at least 1%, or at least 1%. In this way, it can be possible optionally to selectively tune a damping characteristic of the damping structures to the respective case of application of the tuned mass vibration damper. For example, the force exerted by the damping portions and, therefore, by the damping structures on the damper masses can be determined and accordingly possibly configured to be softer or milder by the shaping of the damping portions and, therefore, taking into account the material from which they are made, by the degree of elastic deformation. Therefore, an impact behavior or a damping behavior can possibly be selectively adjusted in this way through the damping portions. Optionally, the damping portion can accordingly extend radially from the support structure.

Additionally or alternatively, the damping portion can have an outer contour in a plane perpendicular to the axis of rotation that is circular segment-shaped, circular arc-shaped, circular, elliptical arc-shaped, elliptical segment-shaped, ellipsoidal, polygonal, rectangular, square, cross-shaped, U-shaped, V-shaped, W-shaped, hook-shaped, web-shaped and/or curved. Accordingly, the outer contour of the damping portion can optionally be substantially constant along the axis of rotation. For example, it can be shaped as a hollow cylindrical segment, hollow cylinder, solid cylinder or solid cylindrical segment. Accordingly, in this case, depending on the specific implementation, the damping portion in a tuned mass vibration damper according to an embodiment example can optionally be constructed as a hollow body or as a solid body.

Further, in a tuned mass vibration damper according to an embodiment example the damping structure can optionally further have at least one connection portion which connects the at least one damping portion to the support structure. The connection portion can optionally also be elastically deformable. Depending on the specific implementation, a corresponding connection portion can be used for a more accurate positioning of the damping portion and/or an additional elastic component can be integrated in the damping structure for adapting the development of force of the damping structure to the requirements imposed on the tuned mass vibration damper according to an embodiment example in a broader manner or also in a multi-stepped manner. In this way, it can be possible optionally to achieve a better positioning of the damping portions and/or a more multi-stepped force development of the damping structures.

Optionally, in a tuned mass vibration damper according to an embodiment example the connection portion can have an outer contour in a plane perpendicular to the axis of rotation that is circular segment-shaped, circular arc-shaped, circular, elliptical arc-shaped, elliptical segment-shaped, ellipsoidal, polygonal and/or web-shaped.

In addition to or as an alternative to this, the connection portion can also optionally be constructed as a hollow body or as a solid body. As has already been explained in connection with the damping portion, it is optionally possible to achieve a more selective adaptation of the development of forces to the requirements set for the tuned mass vibration damper, e.g., a smoother initiation of force delivery. For example, the connection portion or connection portions can also be cylindrical or cylindrical segment-shaped.

Additionally or alternatively in a tuned mass vibration damper according to an embodiment example, the damping structure can comprise a first damping portion and a second damping portion, the first damping portion being configured and arranged to make contact with a first damper mass, and the second damping portion being configured and arranged to make contact with a second damper mass arranged adjacent to the first damper mass. The first damper mass and second damper mass are damper masses of the at least three damper masses of the tuned mass vibration damper. In this way, it can be possible optionally to implement a damping component part in a way that economizes on installation space and, accordingly, to improve the aforementioned compromise.

Optionally in an embodiment example of this type, the first damping portion and the second damping portion can be connected to one another only via the support structure. Likewise optionally and in addition to or as an alternative to this, the first damping portion and the second damping portion can face one another. In this case, for example, the first damping portion and the second damping portion can have a curved shape. Accordingly, in this case the first damping portion and the second damping portion can optionally have, for example, a circular arc-shaped and/or elliptical outer contour in a plane perpendicular to the axis of rotation and can be arranged in such a way that, when not loaded, they substantially form segments of a common circle, a common circular arc, a common ellipse or a common elliptical arc in the plane.

Additionally or alternatively, a tuned mass vibration damper according to an embodiment example can comprise at least four damper masses and at least two damping component parts. The damping component parts can be arranged and configured in such a way that each damper mass can make contact with a damping structure of a different damping component part during a movement along a first direction in circumferential direction than during a movement along a second direction opposite to the first direction. In other words, in an embodiment example of this kind having at least four damper masses and at least two damping component parts, an arrangement of the damping structures of the at least two damping component parts can be selected such that each of the damper masses makes contact with a different damping component part during a movement along the first direction than during a movement along the second direction, wherein the first direction and the second direction run along the circumferential direction of the rotational movement but are oppositely directed. The word "direction" notwithstanding, the individual "directions" may not necessarily refer to a direction in the mathematical sense of a vector, but rather may be a line along which the corresponding movement takes place. A line of this type can be straight or curved. Directions which describe actual directions along a line, for example, the movement direction, are a separate case. Thus, for example, a first direction can be opposite to a second direction, but both can run along or be directed along a line which is also referred to as a "direction".

Accordingly, it can be possible to achieve a further decoupling of the damper masses from one another without significantly increasing production cost. Through the additional decoupling of the damper masses from one another, it can be possible optionally to lessen the influence on their ability to oscillate and, accordingly, to less sharply limit, or even to improve, the efficient damping of the vibration component of the rotational movement. Accordingly, on the whole, the aforementioned compromise can be further improved.

In a tuned mass vibration damper according to an embodiment example comprising at least four damper masses and at least one further damping component part, the latter can be arranged such that a first damping structure of the further damping component part can make contact with a first damper mass and a second damper mass arranged adjacent to the first damper mass, and a second damping structure of the further damping component part can make contact with a third damper mass and a fourth damper mass arranged adjacent to the third damper mass. In this case, a first damping structure of the damping component part can make contact with the first damper mass and the fourth damper mass arranged adjacent to the first damper mass, and a second damping structure can make contact with the second damper mass and a third damper mass arranged adjacent to the second damper mass, Of course, an arrangement of this kind can also be correspondingly expanded to more than four damper masses and to more than two damping component parts.

Two objects are adjacent to one another when no object of the same type is arranged between them. Corresponding objects are directly adjacent when they adjoin one another, i.e., for example, contact one another. In this case, the adjacent arrangement refers to an arrangement along the circumferential direction and not, for example, along the axis of rotation. The damper masses can be equidistant but can also be arranged along the circumferential direction so as to diverge from an equidistant arrangement.

For example, if there are at least three damper masses arranged adjacent to one another in an embodiment example, there is always a damper mass having an adjacent damper mass along the circumferential direction and opposite to the circumferential direction.

The expressions employed herein to describe the arrangement of the individual components, subassemblies and other objects relative to one another always refer to the axis of rotation of the rotational movement. The radial direction, also denoted simply by "radially", is always perpendicular to, and faces away from, the axis of rotation. In a corresponding manner, the axial direction, also denoted simply by "axially", corresponds to the axis of rotation, while the tangential direction, also referred to as circumferential direction or denoted simply by "tangentially", is perpendicular to both the axis of rotation and the radial direction.

Additionally or alternatively in a tuned mass vibration damper according to an embodiment example, the support structure can be configured to connect the at least two damping structures to one another. The damping component part can be a structural component part that can be integrated in its entirety in the tuned mass vibration damper so that it can be installed in a technically simple manner. This can make it possible to facilitate the production of the tuned mass vibration damper and, therefore, to further improve the aforementioned compromise.

Additionally or alternatively, the damping component part in a tuned mass vibration damper according to an embodiment example can be formed in one part or integrally. For example, the damping component part can be made of a plastic, i.e., an injection moldable plastic, for example. Additionally or alternatively, it can also be made of a metallic material, i.e., a plastic and a metallic material, for example. Of course, it can also be constructed as a structural component part comprising multiple parts or pieces. However, the use of an injection moldable plastic can make it possible in this case to produce the damping component part by particularly simple technical means and, therefore, inexpensively so that not only can it be produced in a simple manner, but it can also be integrated in a simple manner into the tuned mass vibration damper according to an embodiment example. By component formed in one piece is meant a component that is made of exactly one contiguous piece of material. A component or structure made, provided or produced in one part or a component or structure made, provided or produced integral with at least one further part means that the component or structure cannot be separated from the at least one further component without destroying or damaging one of the at least two components concerned. Accordingly, a one-piece structural component part is also at least a structural component part which is formed integral with, or forms one part with, another structure of the relevant structural component part.

Additionally or alternatively, in a tuned mass vibration damper according to an embodiment example the damping structures can have a coating in an area in which they make contact with a damper mass during operation of the tuned mass vibration damper, this coating being configured to reduce noise generation compared to a mating of purely metallic materials. This can make it possible to further improve noise development and, therefore, the aforementioned compromise of regardless the material from which the damping component part is made.

Additionally or alternatively, in a tuned mass vibration damper according to an embodiment example the support structure can be configured to support the damping component part so as to be rotatable relative to the at least one guide component part. This can make it possible to implement the damping component part so as to economize on installation space. Optionally, the support structure can comprise at least one circumferential portion which extends in circumferential direction and which is substantially annular, cylindrical, ring segment-shaped and/or cylinder segment-shaped. Accordingly, a very compact implementation of the damping component part can be realized. In a tuned mass vibration damper of this type according to an embodiment example, the support structure can also have, for example, at least two circumferential portions and at least one substantially axially extending axial portion, wherein the axial portion connects a first circumferential portion to a second circumferential portion of the at least two circumferential portions. Accordingly, depending on the specific implementation, the support structure can allow, for example, radial guiding at more than one guide component part insofar as more than one guide component part is provided.

Optionally in a tuned mass vibration damper according to an embodiment example, the damping component part can be configured to enable a rotation of the damping component part relative to the at least one guide component part by a maximum torsional angle along the circumferential direction of the rotational movement and to prevent a rotation of the damping component part relative to the at least one guide component part by an angle exceeding the maximum rotational angle. This can make it possible on the one hand to allow a substantially free oscillation of the damper masses within the maximum oscillating angle and on the other hand to implement a defined, possibly low-noise stop by limiting the rotation to the maximum torsional angle so as to prevent the damper masses from colliding with one another or also to prevent one or more damper masses from striking another structure which could also cause noise. This can also have a positive influence on noise generation and the aforementioned compromise can accordingly be improved.

As has already been mentioned, the support structure in a tuned mass vibration damper according to an embodiment example can additionally or alternatively be configured to radially guide the damping component part through at least one guide component part. This can ensure good operation of the tuned mass vibration damper even under more extreme operating conditions, for example, during extreme shaking.

Optionally, in a tuned mass vibration damper of this type according to an embodiment example the support structure can have an at least partially round outer contour in a plane perpendicular to the axis of rotation. The at least one guide component part which is configured for radially guiding the damping component part can also have in the aforementioned plane an at least partially round outer contour which is configured to cooperate with the outer contour of the support structure to carry out the radial guiding. An implementation which saves installation space can possibly be realized in this way.

Additionally or alternatively, in a tuned mass vibration damper according to an embodiment example the support structure can have at least one guide structure. In this case, the at least one guide component part which is configured to radially guide the damping component part can have at least one complementary guide structure which is configured to engage in the at least one guide structure so as to bring about the radial guiding of the damping component part. In other words, additionally or alternatively, the radial guiding is brought about, or is at least supported, by the interaction of the guide structure and complementary guide structure of the support structure and the relevant guide component part. Depending on the specific implementation, a tuned mass vibration damper which is mechanically stable and/or economizes on installation space can be realized in this way.

Optionally in a tuned mass vibration damper according to an embodiment example the at least one guide structure and the at least one complementary guide structure can be configured to allow a rotation of the damping component part relative to the at least one guide component part along a circumferential direction of the rotational movement by the maximum torsional angle and to prevent a rotation of the damping component part relative to the at least one guide component part by an angle exceeding the maximum torsional angle. To this end, the at least one guide structure and the at least one complementary guide structure can optionally comprise a recess and a projection which are configured to engage with one another so as to bring about the radial guiding of the damping component part, wherein a length of the projection along the circumferential direction differs from a length of the recess by the maximum torsional angle.

Optionally in a tuned mass vibration damper according to an embodiment example, the guide structure of the damping component part can be arranged at a guide portion which extends radially from the support structure. The guide structure can optionally be arranged so as to be radially inwardly located, radially centrally located or radially outwardly located. In this way, it can be possible, depending on design constraints, to make a better compromise between a mechanical loading of the guide structure on the one hand and the installation space conditions on the other hand.

Alternatively, in an embodiment example of a tuned mass vibration damper according to an embodiment example, it can also be possible, of course, that the damping component part is not guided radially, i.e., configured to be radially movable. This can have the result that the damping component part can participate in a radial movement so as to allow a freer movement of the damper masses. The functioning of the tuned mass vibration damper can possibly be further improved in this way. Therefore, the aforementioned compromise can also possibly be improved in this way. Additionally or alternatively, in a tuned mass vibration damper according to an embodiment example the damping component part can be configured to be guided by at least one guide component part along the axis of rotation.

In a tuned mass vibration damper according to an embodiment example, the damper masses can have at least one guide path, respectively. The at least one guide component for the damper masses can also have in each instance at least one guide path corresponding to the guide paths of the damper masses. In this case, the tuned mass vibration damper has in each instance at least one rolling body for the damper masses, which rolling body is configured to roll along the guide paths of the at least one guide component part and along those of the damper masses in order to guide them in such a way that a deflection of the damper masses out of their respective center positions, also referred to as neutral position, leads to a radial displacement of the center of mass of the respective damper mass. It can be possible to implement a speed-adaptive mass damper or tuned mass vibration damper in this way.

A mechanical coupling of two components includes both a direct coupling and an indirect coupling. A frictionally engaging connection is brought about by static friction, a bonding connection is brought about by molecular or atomic interactions and forces, and a positively engaging connection is brought about by a geometric connection of the relevant parts to be connected. Accordingly, the static friction generally presupposes a normal force component between the two parts to be connected.

A component can have an n-fold rotational symmetry, for example, where n is a natural number greater than or equal to 2. An n-fold rotational symmetry exists when the relevant component can be rotated by $(360°/n)$ around an axis of rotation or axis of symmetry and substantially transitions into itself with respect to shape, i.e., substantially self-maps in a mathematical sense after a certain rotation. In contrast, a completely rotationally symmetrical component substantially transitions into itself with respect to shape when rotated by any amount and by any angle around the axis of rotation or axis of symmetry, i.e., substantially self-maps in a mathematical sense. An n-fold rotational symmetry and a complete rotational symmetry are both referred to herein as rotational symmetry.

As has already been mentioned, the above-mentioned features can be implemented individually as well as in combination with each other.

BRIEF DESCRIPTION OF THE DRAWINGS

Embodiment examples will be described and explained more fully in the following with reference to the accompanying drawings in which:

FIG. 1A shows a top view of a conventional tuned mass vibration damper in a first operating state;

FIG. 1B shows the tuned mass vibration damper shown in FIG. 1A in a second operating state;

FIG. 2A shows a top view of a tuned mass vibration damper according to an embodiment example;

FIG. 2B shows a cross section through the tuned mass vibration damper shown in FIG. 2A;

FIG. 3A shows a top view of the tuned mass vibration damper shown in FIGS. 2A and 2B according to an embodiment example in which one of the two guide component parts is not shown;

FIG. 3B shows a perspective view of the tuned mass vibration damper from FIGS. 2A, 2B and 3A in which a guide component part is not shown;

FIGS. 4A, 4B and 4C show a top view and two side views of the damping component part of the tuned mass vibration damper from FIGS. 2A, 2B, 3A and 3B;

FIG. 4D shows a perspective view of the damping component part from FIGS. 4A to 4C;

FIG. 5A shows a top view of a tuned mass vibration damper according to an embodiment example in which the damper masses are in a center position;

FIG. 5B shows an enlarged detail of the view in FIG. 5A;

FIG. 5C shows a top view of the tuned mass vibration damper shown in FIGS. 5A and 5B according to an embodiment example when a maximum torsional angle is reached;

FIG. 5D shows an enlarged detail from FIG. 5C;

FIG. 6A shows a top view of a tuned mass vibration damper according to an embodiment example in which one of two guide component parts is not shown, in a first operating state;

FIG. 6B shows the tuned mass vibration damper shown in FIG. 6A in a second operating state;

FIG. 6C shows a top view of the tuned mass vibration damper from FIGS. 6A and 6B in a third operating state;

FIG. 6D shows a top view of the tuned mass vibration damper shown in FIGS. 6A to 6C according to an embodiment example in a fourth operating state;

FIG. 7A shows a perspective view of a damping component part of a tuned mass vibration damper according to an embodiment example;

FIG. 7B shows a perspective view of a further damping component part of a tuned mass vibration damper according to an embodiment example;

FIG. 7C shows a perspective view of a further damping component part of a tuned mass vibration damper according to an embodiment example;

FIGS. 8A, 8B, 8C show a top view, a side view and a cross-sectional view through a damping component part of a tuned mass vibration damper according to an embodiment example;

FIG. 8D shows a perspective view of the damping component part shown in FIGS. 8A to 8C;

FIGS. 9A, 9B and 9C show a top view, a side view and a cross-sectional view through a further damping component part of a tuned mass vibration damper according to an embodiment example;

FIG. 9D shows a perspective view of the damping component part shown in FIGS. 9A to 9C;

FIGS. 10A, 10B and 10C show a top view, a side view and a cross-sectional view through a further damping component part of a tuned mass vibration damper according to an embodiment example;

FIG. 10D shows a perspective view of the damping component part shown in FIGS. 10A to 10C;

FIGS. 11A, 11B and 11C show a top view, a side view and a cross-sectional view through a further damping component part of a tuned mass vibration damper according to an embodiment example;

FIG. 11D shows a perspective view of the damping component part shown in FIGS. 11A to 11C;

FIGS. 12A, 12B and 12C show a top view, a side view and a cross-sectional view through a further damping component part of a tuned mass vibration damper according to an embodiment example;

FIG. 12D shows a perspective view of the damping component part shown in FIGS. 12A to 12C;

FIGS. 13A, 13B and 13C show a top view, a side view and a cross-sectional view through a further damping component part of a tuned mass vibration damper according to an embodiment example;

FIG. 13D shows a perspective view of the damping component part shown in FIGS. 13A to 13C;

FIGS. 14A, 14B and 14C show a top view, a side view and a cross-sectional view through a further damping component part of a tuned mass vibration damper according to an embodiment example;

FIG. 14D shows a perspective view of the damping component part shown in FIGS. 14A to 14C;

FIG. 20A shows a fragmentary front view of the tuned mass vibration damper from FIG. 19 in a first operating state;

FIG. 20B shows a view of the tuned mass vibration damper comparable to FIG. 20A in a second operating state;

FIGS. 22A and 22B show a top view and a cross-sectional view through a further damping component part of a tuned mass vibration damper according to an embodiment example;

FIG. 22C shows a perspective view of the damping component part shown in FIGS. 22A and 22B;

FIGS. 23A, 23B and 23C show a top view, a side view and a cross-sectional view through a further damping component part of a tuned mass vibration damper according to an embodiment example;

FIG. 23D shows a perspective view of the damping component part shown in FIGS. 23A to 23C;

FIGS. 24A, 24B and 24C show a top view, a side view and a cross-sectional view through a further damping component part of a tuned mass vibration damper according to an embodiment example;

FIG. 24D shows a perspective view of the damping component part shown in FIGS. 24A to 24C;

FIGS. 25A, 25B and 25C show a top view, a side view and a cross-sectional view through a further damping component part of a tuned mass vibration damper according to an embodiment example;

FIG. 25D shows a perspective view of the damping component part shown in FIGS. 25A to 25C;

FIGS. 27A, 27B and 27C show a top view, a side view and a cross-sectional view through a further damping component part of a tuned mass vibration damper according to an embodiment example;

FIG. 27D shows a perspective view of the damping component part shown in FIGS. 27A to 27C;

FIG. 28A shows a cross-sectional view through a tuned mass vibration damper according to an embodiment example with two of the damping component parts from FIGS. 27A to 27D;

FIG. 28B shows a perspective view of the tuned mass vibration damper from FIG. 28A in which one of the two guide component parts is not shown; and FIG. 28C shows a perspective view of the two damping component parts of the tuned mass vibration damper from FIGS. 28A, 28B in a perspective view relative to one another.

DETAILED DESCRIPTION OF THE PRESENTLY PREFERRED EMBODIMENTS

Figure 15:
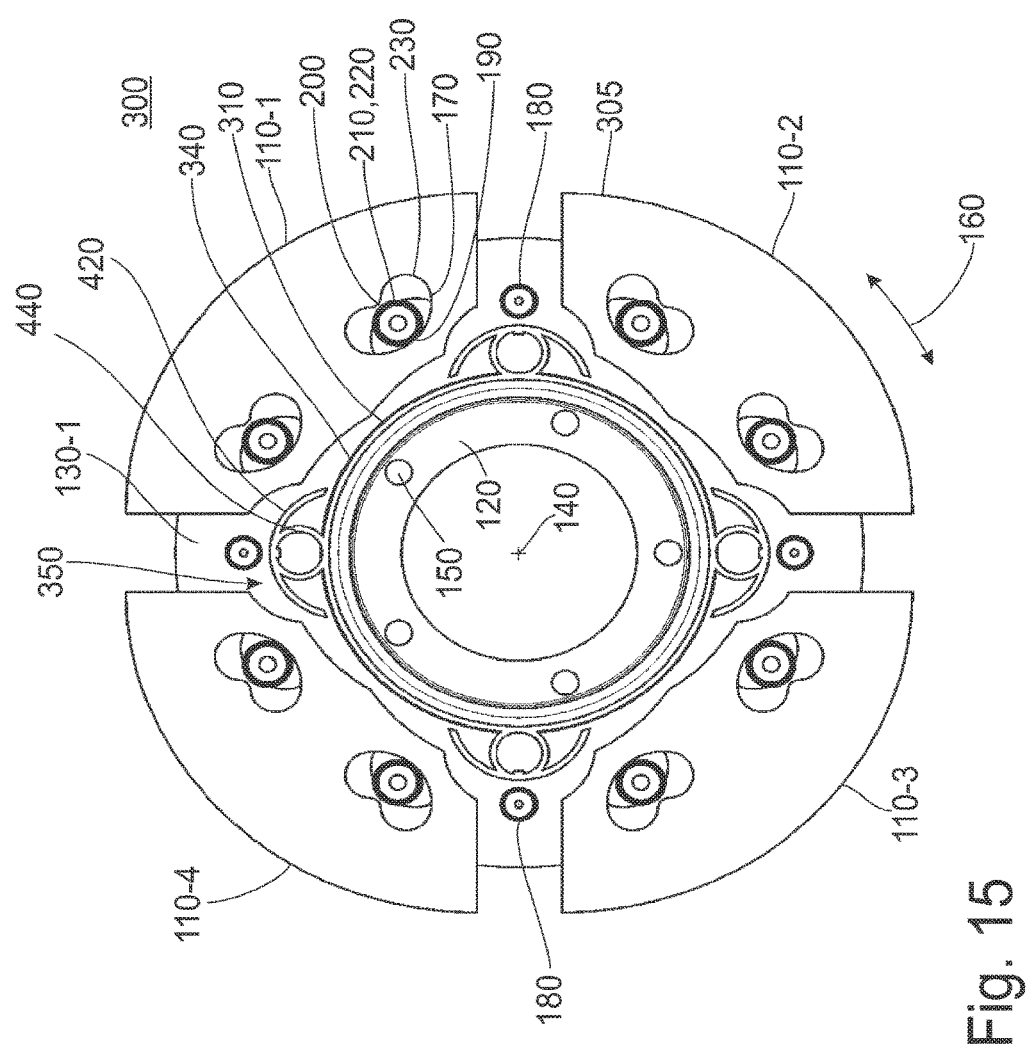
FIG. 15 shows a top view of a tuned mass vibration damper according to an embodiment example in which a guide component part is not shown and which comprises the damping component part shown in FIGS. 14A to 14D.

Identical or comparable components are denoted by identical reference numerals in the following description of the accompanying drawings. Further, collective reference numerals are used for components and objects which occur more than once in an embodiment example or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description.

As was already mentioned above, tuned mass vibration dampers and other vibration dampers are used in many areas of machine, plant and automotive engineering in which there are unwanted vibration components when a rotational movement of a shaft is generated, transmitted or utilized. These vibration components can be reduced or even completely eliminated through the use of a corresponding vibration damper.

For example, corresponding rotational irregularities can occur in drivetrains of motor vehicles, i.e., for example, drivetrains of passenger cars, trucks and utility vehicles, due, for example, to the operating principle of an internal combustion with a discontinuous power development owing to the combustion process taking place in this internal combustion engine. The rotational movement is transferred from the crankshaft via a start-up element, which allows continued running of the internal combustion engine even when the vehicle is stopped, to a transmission input shaft or other input shaft of a component downstream of the start-up element. The start-up element can be based, for example, on a hydrodynamic clutch, a frictionally engaging clutch or a combination of these two concepts.

Frictionally engaging contact exists when two objects enter into frictionally engaging contact with one another such that a force is formed therebetween in case of a relative movement perpendicular to a contact surface, which allows a force, a rotational movement or a torque to be transmitted. In this case, there can be a difference in rotational speed, i.e., slip, for example. Apart from this type of frictionally engaging contact, a frictionally engaging contact also includes a frictionally engaging connection between the relevant objects in which a corresponding difference in rotational speed, or slip, essentially does not occur.

A corresponding start-up element can be implemented, for example, as a hydrodynamic converter with a lockup clutch.

Vibration dampers, which also include tuned mass vibration dampers, have energy accumulator elements which are arranged and configured such that they can absorb energy peaks which occur during rotational irregularities and can couple them into the rotational movement again at another time. In this way, the unwanted vibration components are reduced or damped and possibly even completely eliminated.

In tuned mass vibration dampers, the energy accumulator elements are not included in the torque flow or transmission path of the rotational movement. Rather, they are merely coupled with the rotational movement by means of a flange and can accordingly absorb the corresponding energy and release it again via the flange.

The energy accumulator elements have damper masses which move in a force field that is formed by the gravity force and the centrifugal forces acting on the damper masses. Depending on the operating state of the tuned mass vibration damper, these two forces can be in a different proportion to one another in terms of magnitude, which is why the damper masses may possibly collide with one another or strike their end points in unfavorable operating states. In conventional tuned mass vibration dampers, such events are frequently perceived by a driver and passengers of a corresponding motor vehicle, or even by passing pedestrians, as unpleasant because they occur unexpectedly and may be accompanied by consequently unpleasant noises. Since the relevant components are usually made of a metallic material, the corresponding noises are frequently metallic-sounding.

As will be shown in the following, it can be possible through the use of an embodiment example of a tuned mass vibration damper to prevent or at least reduce metallic noises which can occur, for example, in normal driving operation as well as in crawl operation of the vehicle and after the internal combustion engine, also referred to as engine, has been switched off. Events of the type described above can occur comparatively often precisely in vehicles which are outfitted with an automatic engine stop-start system.

For a more detailed illustration, FIGS. 1A and 1B show a top view of a conventional tuned mass vibration damper 100 having four damper masses 110-1, 110-2, 110-3 and 110-4 which are configured precisely so as to carry out an oscillation depending on the rotational movement that is coupled in via a flange region 120 in order to damp a vibration component of the rotational movement. To this end, the tuned mass vibration damper 100 in the form shown here has two guide component parts 130, only one of which is shown in FIGS. 1A and 1B for the sake of clarity. The flange region 120 is formed in the area of an axis of rotation 140 radially inside of one of the guide component parts and correspondingly includes therein a plurality of flange bores 150 for mechanically fastening the tuned mass vibration damper 100 to another component.

The guide component parts 130 are configured to movably guide the damper masses 110 in precisely such a way that they are arranged so as to be offset along a circumferential direction 160 perpendicular to the axis of rotation 140 of the rotational movement and can execute the oscillation. To this end, the damper masses 110 and the guide component parts 130, which are also referred to as guide plates owing to their plate-like construction, have guide paths 170, only one of which, by way of example, is designated by the relevant reference numeral in FIGS. 1A and 1B. Since the damper masses 110 cover particularly the guide paths 170 in the guide component parts 130, they are also not visible in FIGS. 1A and 1B.

The guide paths 170 of the damper masses 110 and of the guide component parts 130 which are fixed with respect to rotation relative to one another and so as to be spaced apart at fixed distances along the axis of rotation 140 by a spacer connection in the form of a plurality of spacer rivets 180 correspond to one another. Accordingly, the guide paths 170 of the damper masses 110 and of the guide component part 130 are constructed substantially identically, but are oriented in a mirror-inverted manner with respect to one another so that when the damper masses are deflected out of a center position a center of mass of the damper masses 110 is radially shifted. The guide paths 170 are substantially kidney-shaped, i.e., have a continuous curved portion 190 and an indented portion 200 opposite thereto.

In order to allow a guiding of the damper masses 110 through the guide component parts 130, the tuned mass vibration damper 100 further has for each damper mass 110 at least one, in the present case two, rolling bodies 210 which are constructed in this case as stepped rollers 220.

In normal operation, the noises mentioned above can occur, for example, when the damper masses 110, also referred to as flyweights, strike the ends 230 of the guide paths 170. This can happen, for example, when, as a result of occurring vibrations, the damper masses 110 tend to have a greater oscillation amplitude than is permitted by the maximum design oscillation angle, also referred to as torsional angle, as is shown by way of example in FIG. 1A.

This results in a collision between the rolling bodies 210 and the ends 230 of the relevant guide paths 170.

In this operating state, a centrifugal force 240 is typically greater in magnitude than a weight force 250 acting on the damper masses 110.

However, as is shown in FIG. 1B, this situation can change when there is a decrease in speed of the rotational movement that is coupled into the tuned mass vibration damper 100. For example, after the engine is switched off, the rotational speed of the transmission input shaft to which the tuned mass vibration damper can be coupled so as to be fixed with respect to relative rotation or so as to be rigid with respect to rotation can drop to zero. In this case, however, as the speed of the transmission input shaft decreases, the centrifugal force 240 acting on the damper masses 110 also decreases in magnitude. Accordingly, the damper masses 110 are subject to little or no radial constraints and/or constraining forces. In this type of operating point or operating state, due to the weight forces 250 acting on the damper masses, these damper masses can possibly slide along their guide paths 170, also referred to as paths, or can even drop.

Depending on the specific setting of the tuned mass vibration damper 100 and guide component parts 130 thereof, the damper masses 110 can strike their respective path ends 230 and/or collide with one another as is illustrated by way of example in FIG. 1B by collision point 260. This can cause a rattling noise which is audible both inside and outside of the vehicle and which is often found annoying.

Conventionally, this can be mitigated, for example, by inserting plastic elements between the damper masses 110. But these plastic elements can also fall out during unfavorable operating states or because of faulty assembly. It is also conceivable to mechanically couple the damper masses 110 to one another. However, during operation, a damper mass can impede the freedom of movement of the adjacent damper mass through this coupling. This can possibly lead to a reduced functionality or functional characteristic of the tuned mass vibration damper 100.

FIG. 2A shows a top view of a tuned mass vibration damper 300 according to an embodiment example of the present invention which differs from the conventional tuned mass vibration damper 100 shown in FIGS. 1A and 1B substantially with respect to a damping component part 310. Therefore, as regards the further components of the tuned mass vibration damper 300, reference is made to the description of tuned mass vibration damper 100. It is noted here that it is possible, for example, that embodiment examples of a tuned mass vibration damper 300 may differ in design from the conventional construction described above. Accordingly, the guide paths 170 can, of course, also be constructed differently than in the preceding description. For example, it is possible to omit the indentation or indented portion 200. Of course, different guide path geometries can also be used optionally. Likewise it will be appreciated that more than four or less than four damper masses 110 and a different quantity of guide paths 170, possibly having differently shaped rolling bodies 210, can also be provided. It can also be possible to implement damper masses 110 and guide component parts 130 which make do entirely without any rolling bodies 210. The rolling bodies can also possibly be formed integral with the damper masses 110. As the above-mentioned examples show, embodiment examples of a tuned mass vibration damper 300 are in no way limited to the particulars of construction given in connection with the drawings described thus far, which will also be demonstrated particularly in the further description.

While exactly four damper masses 110 are implemented in the present embodiment example, a different quantity of damper masses 110 can, of course, also be used in other embodiment examples insofar as at least three damper masses 110 are distributed along the circumferential direction. The individual damper masses can be constructed so as to comprise one piece, one part or a plurality of parts. In the present depicted embodiment, the damper masses 110 are formed of three individual damper masses 305 arranged adjacent to one another along the axis of rotation 140. The individual damper masses 305 are not fixedly connected to one another mechanically in the implementation shown here, but rather can move independently from one another owing to manufacturing tolerances or other influences in the course of being guided through the guide component parts 130. In this case, they are guided in common in the guide paths 170 of the guide component parts 130 via the rolling bodies 210, which are constructed as stepped rollers 220, and in turn have their own guide paths 170 in each instance. Therefore, the individual damper masses 305 may also be regarded as damper masses 110, but are not arranged along the circumferential direction 160 so as to be offset with respect to one another. This distinguishes the individual damper masses 305 from the damper masses 110 which are arranged in an offset manner along the circumferential direction 160 and, therefore, so as to be distributed along the circumference 160.

FIG. 2A shows a top view of the tuned mass vibration damper 300 according to an embodiment example which is comparable to FIG. 1A or 1B, but in which both guide components 130-1, 130-2 are shown. FIG. 2B shows a sectional view along section line A-A through the tuned mass vibration damper 300. In view of the selected rendering in which a first guide component part 130 comprising the flange region 120 is shown on the left-hand input side, the first guide component part 130 is also referred to as left-hand guide component part or, in view of the implementation of the guide path 170 and the plate-like configuration thereof, as left-hand path plate. Correspondingly, a second guide component part 130-2 which is arranged at an end of the tuned mass vibration damper 300 on the side opposite the first guide component part 130 along the axis of rotation is also referred to as right-hand guide component 103-2 or as right-hand path plate. As has already been mentioned, the guide paths 170 in the embodiment example shown here are also substantially kidney-shaped and are therefore also referred to as kidney-shaped oscillating path or, for brevity, kidneys. The guide component parts 130 are mechanically connected to one another so as to be fixed with respect to relative rotation by the spacer rivets 180, also referred to as spacer pieces or, for brevity, rivets. Of course, in other embodiment examples, techniques other than spacer rivets can be used for the mechanical connection of the guide component parts 130. It is also possible to implement fewer than two guide component parts 130, namely, for example, only one individual guide component part. It may also possibly be advisable to implement more than two guide component parts.

It is noted here purely for the sake of completeness that the flange bores 150, for example, in a hydrodynamic converter as start-up element, can be used for mechanically connecting to a torsional damper thereof which the hydrodynamic converter can include in connection with its lockup clutch. In this case, the corresponding bores or flange bores 150 can be used, for example, for riveting the tuned mass vibration damper 300 to the relevant torsional damper.

As has already been stated, the tuned mass vibration damper 300 according to an embodiment example, in contrast to the tuned mass vibration damper 100 from FIGS. 1A and 1B, has the damping component part 310 which can be made of plastic, for example, and which is therefore also referred to as plastic ring. The damping component part 310 in the present embodiment example is configured substantially as an inner ring with a cup-shaped structure that will be described in more detail referring to the further drawings. The damping component part 310 is configured to be rotatable relative to the guide component parts 130 around the axis of rotation 140 of the rotational movement. The damping component part 310 is configured precisely in such a way that it allows the damping component part 310 to rotate relative to the guide component parts 130 by a maximum torsional angle along the circumferential direction 160 of the rotational movement, but prevents a rotation at an angle exceeding this maximum torsional angle. In other words, the damping component part 310 can be rotated selectively relative to the guide component part 130, the damping component part 310 and guide component part 130 being connected to one another so as to be fixed with respect to relative rotation by the spacer rivets 180, by an angle that is less than the aforementioned maximum torsional angle, but not by a greater angle. For this reason, the damping component part 310 has cutouts 320 in a portion guided parallel to the flange region 150, which cutouts 320 leave the flange bores 150 uncovered and are shaped precisely in such a way that a mechanical connection, for example, a corresponding rivet, which is also guided through the flange bores 150 also does not come in contact with the damping component part 310 at the maximum prevailing torsional angle. A mechanical shearing load of the connection means in question, i.e., for example, the rivets in question, can be prevented in this way. However, it is, of course, also possible to utilize a corresponding limiting of the torsional angle by the walls of the cutouts 320 making contact in a corresponding manner with the relevant structures for fastening the tuned mass vibration damper 300 to another subassembly.

Other constructional solutions for this purpose will be described more fully in the course of the further description. For example, the damping component part 310 can be made of an injection moldable material which can make it possible to produce the guide component part 130 in a particularly simple manner within the framework of an injection molding process. Of course, other plastics can also be used. Metallic materials can also be used in addition or as an alternative, i.e., for example, metals, alloys or metals or alloys supplemented by nonmetallic substances. Aside from thermosets and thermoplastics, elastomers can also be used in their entirety or in part as plastics, for example, for covering or coating particular areas of the damping component part. In this way, noise generation can optionally be reduced compared to a purely metallic pairing of materials in case the damping component part 310 contacts one of the damper masses 110.

While FIGS. 2A and 2B show a top view and sectional view of a subassembly of a tuned mass vibration damper 300, also referred to as speed-adaptive damper, with a damping component part 310 installed therein, FIGS. 3A and 3B show a top view and a perspective view of the relevant damper assembly in which a right-hand guide component part 130-2 is not visible.

As is also shown in FIGS. 3A and 3B, the damping component part 310 has a substantially cup-shaped construction with a central recess 330 that extends substantially perpendicular to the axis of rotation 140 and accordingly forms a "hole" in a base of the cup-shaped construction.

Further, the damping component part 310 has a support structure 340 and at least two damping structures extending radially from the support structure 340, there being a total of four damping structures 350-1, 350-2, 350-3 and 350-4 in the present embodiment example. In other embodiment examples, there can also be a larger or smaller quantity of damping structures 350, also referred to as driver elements, than the four damping structures 350 implemented in this case. These damping structures 350 are configured and arranged in such a way that one of the damping structures 350 in each instance prevents contact between two adjacent damper masses 110 through elastic deformation when making contact with one of the two adjacent damper masses 110.

Additionally or alternatively, the damping component part 310 can also produce a different or further effect. In particular, precisely when one of its damping structures 350 makes contact with a damper mass 110, this damping component part 310 can be rotatable, or can be rotated, in such a way that another one of its damping structures 350 makes contact with another damper mass 110. This can result in a temporary coupling of the damper masses 110 with one another, by means of which a striking of the further damper mass 110 can be prevented so that an annoying noise can be prevented or at least reduced. Depending on the specific implementation of an embodiment example and possibly depending on the intensity with which contact is made, a deformation of the damping structure 350 and/or of the further damping structure 350 can take place. Additionally or alternatively, a movement of the further damper mass 110 can possibly also take place when the further damper mass 110 makes contact with the further damping structure 350. For example, if the tuned mass vibration damper 300 has an even-number quantity of damper masses, the damper mass 110 and further damper mass 110 can be located opposite one another. Of course, similar and/or different arrangements of these two damper masses 110 are also possible in tuned mass vibration dampers with either even or odd numbers.

Whereas the quantity of damping structures 350 of the damping component part 310 is at least two and the quantity of damper masses 110 of the tuned mass vibration damper 300 is at least three, i.e., both can essentially have any greater quantity independent from one another, it may possibly be advisable to select a total quantity of damping structures 350 of the tuned mass vibration damper 300 that corresponds to the number of damper masses 110. In so doing, it is not necessary that the damping structures 350 belong to a single damping component part 310. On the contrary, a plurality of damping component parts 310 can also be used in connection with a tuned mass vibration damper 300 of this type. In this connection, it is relevant only that only exactly one damping structure 350 which is configured exactly as was described above is arranged between two adjacent damper masses 110. It can have one damping portion, but can also have a plurality of damping portions. A damping structure 350 is arranged between two adjacent damper masses 110 precisely when there is a corresponding pitch circle which intersects the two damper masses 110 in question and precisely the one damping structure 350 is arranged therebetween along the relevant pitch circle.

The support structure 340 serves inter alia to connect the damping structures 350 to one another. To this end, the support structure in the damping component part 310 of a tuned mass vibration damper 300 shown here is annular or cylindrical. The support structure 340 accordingly forms a wall of the cup-shaped structure of the damping component part 310. Depending on the specific implementation of a corresponding damping component part 310, however, the support structure 340 can also be shaped differently as will be explained in the following. For example, it can have only one circumferential portion 360 which extends along the circumferential direction 160 and which is only partially annular or cylindrical, i.e., ring segment-shaped or cylinder segment-shaped. A corresponding circumferential portion 360 can also possibly have a different geometric shape in another damping component part 310.

Depending on the specific embodiment, the support structure 340 can also serve, for example, to support the damping component part 310 rotatably relative to at least one of the guide component parts 130 or, in case of only a single guide component part 130, can serve to support the damping component part 310 rotatably with respect to the latter. In this regard, the geometric shape of the support structure 340 described above can serve this purpose, for example. In other words, the support structure 340 can have an at least partially round outer contour in a plane perpendicular to the axis of rotation 140.

Further, a radial guiding of the damping component part 310 in cooperation with at least one of the guide component parts 130, or the guide component part 130 insofar as only one guide component part 130 is implemented, can also be associated with the rotatable support. The support structure 340 can also serve this purpose. Accordingly, in this case, for example, the support structure 340 can have an at least partially round outer contour in a plane perpendicular to the axis of rotation 140. In this case, the guide component part 130 which is used for radially guiding the damping component part 310 can also have an at least partially round outer contour in the same plane so that this outer contour can cooperate with the outer contour of the support structure 340 precisely so as to bring about the radial guiding.

Additionally, however, the embodiment example shown here has guide structures which are arranged at guide portions 370 in the damping component part 310 shown here and which will be described more fully referring to the further drawings. Two adjacent guide portions 370 in each instance form the cutouts 320 in a base region of the cup-shaped structure of the damping component part 310.

As can be seen from FIGS. 2A, 2B, 3A and 3B, the damping component part 310, also referred to as ring, is located between the two guide component parts 130-1, 130-2 in the tuned mass vibration damper 300 illustrated here. Accordingly, the damping component part 310 is held in axial direction, i.e., along the axis of rotation 140. In other words, the damping component part 310 is configured precisely such that it is guided through the guide component part 130, or guide component parts 130, along the axis of rotation 140.

The support of the ring in radial direction, i.e., the radial guiding thereof, can be implemented through the shape of the support structure 340 as well as through guide structures which can be arranged, for example, at the guide portions 370. However, the guide portions 370 and the corresponding guide structures represent optional components that can be omitted, as the case may be, owing to the positive engagement between the damping component part 310 and first guide component part 130-1 (left-hand plate path). As will be shown in more detail in the further description, the damping component part 310 is rotatably supported and can rotate by a defined angle, namely, within the maximum torsional angle.

FIGS. 4A, 4B, 4C and 4D, respectively, show the damping component part 310 of the tuned mass vibration damper 300 from FIGS. 2A, 2B, 3A and 3B in a top view, two side views and a perspective view. FIGS. 4A to 4D again show the substantially cup-shaped structure of the damping component part 310 with its support structure 340 which extends around the axis of rotation 140, substantially in the shape of a hollow cylinder, as outer wall of the cup-shaped structure. FIGS. 4A to 4D also show the central recess 330 and the four damping structures 350-1, 350-2, 350-3 and 350-4 as well as a total of five guide portions 370 which extend radially, in the present case radially inwardly, from the support structure 340. A guide structure 380, here shaped as a projection 390, is arranged in each instance at the guide portions 370 at a side facing the first guide component part 130-1 (not shown in FIGS. 4A to 4D). The projections, also referred to as guide noses in view of their shape and function, are aligned and arranged precisely in such a way that they can engage in corresponding recesses or cutouts in the relevant guide component part 130 in order to bring about the radial guiding of the damping component part 310. Accordingly, the support of the damping component part 310 in radial direction is carried out in the damping component part 310 shown here by means of the guide structures 380 which are implemented as projections 390 and which are guided in corresponding complementary guide structures in the form of recesses or cutouts in the guide component part 130. This is also shown in FIGS. 5A to 5D. Of course, the arrangements of projections 390 and recesses can also be reversed.

FIG. 5A shows a top view of the tuned mass vibration damper 300, already described above referring to FIGS. 2A to 4D, from the side of the first guide component part 130-1 in which the damper masses 110 are in a center position. In a corresponding manner, the rolling bodies 210 are also arranged substantially in the center of the guide path 170 in the area of the deepest indentation of the indented portion 200.

FIG. 5B shows an enlarged area of the region designated by a circle A in FIG. 5A. This illustrates how the guide structure 380 implemented as projection 390 engages in a corresponding complementary guide structure 400 which is implemented as recess 410 and accordingly enables the radial guiding of the damping component part 310.

Recess 410 extends over a length or angular area which differs by the maximum torsional angle from a length or angular area along which the projection 390 extends. Accordingly, in the damping component part 310 shown here, the recess 410 in the first guide component part 130-1 extends at the maximum torsional angle along the circumferential direction 160 more than the projection 390 of the damping component part 310 extends along the circumferential direction 160.

While FIGS. 5A and 5B show the situation of the tuned mass vibration damper in which the damper masses 110 are in the center position and the guide structure 380 is also arranged correspondingly substantially centrally in the complementary guide structure 400, FIGS. 5C and 5D show views comparable to FIGS. 5A and 5B in which the damper masses 110 are in a state of maximum deflection and the rolling bodies 210 have approached the ends 230 of the guide paths 170. However, the guide structures 380 in cooperation with the complementary guide structures 400 prevent the rolling bodies 210 from making contact with the ends 230 of the guide paths 170. On the contrary, in the embodiment example of a tuned mass vibration damper 300 shown here, the guide structures 380 make contact with the complementary guide structures 400 and accordingly limit the maximum torsional angle of the damping component part 310 relative to the guide component parts 130 so that—through the agency of the damping structures 350—the rolling bodies 210 can likewise be prevented from striking the ends 230 of the guide paths 170. FIG. 5D shows how the guide structure 380 strikes a left-hand end of the complementary guide structure 400 before the rolling bodies 210 in FIG. 5C reach the ends 230 of the guide paths 170.

The configuration of the damping structures 350 in the present embodiment example will be described more fully referring once more to FIGS. 4A to 4D in order to further explain the interaction between the damping structure 350 and the damper masses. In the damping component part 310 shown here, the damping structures 350 comprise two damping portions 420-1, 420-2. In the damping component part 310 shown here, these two damping portions 420-1, 420-2 extend radially from the support structure 340 and are configured and arranged to make contact with at least one of the adjacent damper masses 110 (not shown in FIGS. 4A to 4D) and, in so doing, to deform elastically. The damping portions 420 have a circular-arc segment-shaped outer contour in a plane perpendicular to the axis of rotation 140 as is shown in FIG. 4A, for example. The outer contour remains substantially constant with respect to its shape and dimensioning along the axis of rotation 140.

In the damping component part 310 shown here, the two damping portions 420-1, 420-2 are connected to one another only through the support structure 340. There is no interconnection. The two circular-arc segment-shaped damping portions 420-1, 420-2 face one another, i.e., are curved, such that they substantially form segments of a common circle or circular arc in the above-mentioned plane perpendicular to the axis of rotation 140 in substantially load-free state as is shown in FIGS. 4A to 4D.

The first and second damping portions 420-1, 420-2 of the relevant damping structure 350 are configured and arranged in precisely such a way that the first damping portion 420-1 can make contact with a damper mass 110 arranged adjacent to it along circumferential direction in a first direction, while the second damping portion 420-2 can make contact with a damper mass 110 arranged adjacent to it along the circumferential direction 160 in the opposite direction. In this way, it can be possible optionally to provide a very compact but nevertheless mechanically stable and sturdy damping structure 350 with only a small radially outward profile. Depending on the specific implementation, it can possibly be advisable that the damper masses 110 are also constructed with a corresponding outer contour adapted to the geometry of the damping portions 420 in a corresponding area in which they make contact with the damping portions 420. In other words, it can possibly be advisable that the damper masses 110 are also formed with a cylindrical segment-shaped outer contour in such an area.

Due to the fact that the damping structures 350 or damping portions 420 thereof can possibly support the damper masses during operation, they are also referred to as supporting brackets.

In terms of function, therefore, the function performed by the damping component part 310 consists in that the damper masses 110 are supported relative to one another. In this way, it can be possible optionally to bring about a damping of the damper masses 110 in or before their stops. It can also be possible optionally to keep the damper masses 110 spaced apart through the support of the damper masses 110 relative to one another so that the damper masses 110 can be prevented from colliding with one another, which can happen, for example, when switching off the engine. This can have the result that the rattling noises no longer occur at all or, as the case may be, are at least damped to the extent that they are barely perceptible, if at all, inside or outside the vehicle.

Accordingly, in contrast to other solutions, a guiding of the damper masses 110 and a damping of the noises that are possibly generated by them can possibly be realized independently from spacer pieces, i.e., for example, rivets. In this way, it can be possible optionally to implement new design possibilities with respect to the constructional layout of the damping component part 310. In this connection, a significant aspect of the damping component part 310 is its rotatable bearing support which can prevent, or at least inhibit, the damper masses 110 from jamming in or adhering to the damping component part 310.

Accordingly, a free oscillation angle of the damper masses 110 can optionally be defined through the proportions and geometries of the damping structures 350 and damping portions 420 thereof. On the other hand, properties such as stiffness and damping can possibly be realized through a suitable geometry or a suitable choice of material. Owing to the rotatable bearing support of the damping component part 310, a free oscillation of the damper masses 110 within the defined angle is not impeded.

FIGS. 6A, 6B, 6C and 6D show views of the tuned mass vibration damper 300 comparable to FIG. 3A under various conditions to illustrate functioning in various operating states of the tuned mass vibration damper 300 according to an embodiment example. FIG. 6A shows a situation similar to that in FIG. 3A. This is a situation that can occur, for example, during engine operation. During normal operation of this type, the centrifugal force 240 acting on the damper masses 110 is generally substantially higher in magnitude than a corresponding weight force component 250. Therefore, the damper masses 110 are retained radially outward and move along their guide paths 170 corresponding to the existing excitation. FIG. 6A shows a situation in which the damper masses 110 are arranged in their center positions as has already been shown in FIG. 3A.

Whereas the damping portions 420 do not contact the damper masses 110 in the situation shown in FIG. 6A, all of the damper masses 110 are deflected along the same direction in the situation illustrated in FIG. 6B. As a result, the damper masses 110 make contact with the corresponding damping portions 420, i.e., for example, the first damper mass 110-1 makes contact with the first damping portion 420-1. Therefore, the damping component part 310 is rotated. A significant elastic deformation of the damping portions 420 or of the damping structure 350 does not occur, although, of course, an elastic deformation that is detectable macroscopically occurs here as well.

In the situation in FIG. 6B, the tuned mass vibration damper 300 is shown with damper masses 110 deflected to the maximum extent, i.e., at maximum oscillation amplitude. Before the damper masses 110 can go into the stops of their guide paths 170 which are formed by the corresponding path ends 230, they are supported relative to one another by means of the damping structures 350 or, in the present embodiment example, by means of the damping portions 420 of the damping structures 350. In doing so, the damping component part 310 rotates slightly. In addition, the oscillation angle can optionally be limited by means of the guide structures 380 and corresponding complementary guide structures 400 (not shown in FIGS. 6A to 6D), i.e., the guide noses and corresponding guides of the guide component parts 130 as was illustrated, for example, in FIGS. 5A to 5D. As has already been mentioned, FIGS. 5A to 5D show the torsional vibration damper 300 in a rear view in which the first guide component part 130-1 of the damper assembly faces forward. The guiding of the damping component part 310 in circumferential direction 160 is shown in the two detailed views in FIGS. 5B and 5D.

Again for the sake of clarity, the second guide component part 130-2 is not shown in FIGS. 6A to 6D.

FIGS. 6C and 6D show a second state in which the engine is switched off, wherein the transmission input shaft continues to run due to its inertia. A similar situation can also take place during a crawl operation of the vehicle, for example.

During slow crawling, the transmission input shaft typically rotates at a lower speed than engine speed. In such a case, unlike in normal operation of the engine as was shown in FIGS. 6A and 6B, the weight force 250 of the damper masses 110 is appreciably greater in magnitude in this state than the corresponding component of centrifugal force 240.

The situation is similar when switching off the engine. The transmission input shaft continues to run for several seconds. After a certain time, the amount of weight force 250 exceeds that of the opposed centrifugal force component 240 as is shown in FIGS. 6C and 6D. In the absence of appropriate steps, the damper masses 110 would fall uncontrolledly into the stops, i.e., the ends 230 of the guide paths 170, as has already been mentioned and described in connection with FIGS. 1A and 1B.

In both states, the damping component part 310 ensures that the damper masses 110 are kept apart so that no collisions are possible. In other words, the damping structures 350 prevent contact between adjacent damper masses 110.

Further, the damping component part 310 holds the damper masses 110 in their radial position and accordingly prevents the damper masses 110 from striking the rolling bodies 210 in radial direction.

As is shown in FIG. 6C, for example, the second damper mass 110-2 and the third damper mass 110-3 have dropped down and come into contact with the damping portions 420 of the relevant damping structure 350 arranged below. The first damper mass 110-1 and the fourth damper mass 110-4 also drop down due to the weight force and are intercepted by the corresponding damping portions 420 of the damping structures 350 arranged on the left-hand side and right-hand side referring to FIG. 6C in time to prevent their rolling bodies 210 from striking the ends 230 of the guide paths 170. The damping structure 350 arranged at the top in FIG. 6C is in a non-tensioned state.

FIG. 6D shows a situation in which the second damper mass 110-2 is in its center position and—as the correspondingly lowest damper mass 110 due to the weight force 250—does not mechanically load the damping portions 420 of the damping structures 350 arranged adjacent thereto in both circumferential directions 160. However, the situation is different with respect to the first damper mass 110 and the third damper mass 110-3 which mechanically loads a corresponding damping portion 420 of the two damping structures 350 mentioned above. Owing to a slight rotation, the fourth damper mass 101-4 has also not come to a halt in its center position, but rather has moved in direction of a maximum deflection. Also because of this, one of the relevant damping portions 420 of one of the damping structures 350 has made contact with the relevant fourth damper mass 101-4.

As far as the question of guiding in circumferential direction and radial support, the tuned mass vibration damper 300 implemented in the above-described embodiment example of a tuned mass vibration damper 300 is precisely one in which the guide structure 380 is arranged substantially centrally on the guide portions 370. However, other appropriate implementations can also be selected as will be explained more fully, for example, in connection with FIGS. 7A, 7B and 7C.

In principle, the guide structures 380, i.e., for example, projections 390, can be positioned in any way on the guide portions 370. Accordingly, for example, the guide structures 370 can be arranged radially inwardly as is shown in FIG. 7A, radially outwardly at the support structure 340 as is shown in FIG. 7B, or centrally on the guide portions 370 as is shown, for example, in FIG. 4D. Where appropriate, the guide structures can also be entirely omitted as is shown, for example, in FIG. 7C. A radial support of the damping component part 310 is carried out in this case by a positive engagement with at least one of the guide component parts 130, i.e., for example, the first guide component part 130-1, as was already shown referring to FIG. 2B.

Therefore, depending on the specific implementation, it is also possible to dispense with the guide portions 370. The latter have no function at least with respect to the question of receiving guide structures 380 with respect to those of the damping component parts 310 shown in FIGS. 7B and 7C. For example, in the damping component part 310 shown in FIG. 7B, the guide structures 370 are arranged directly at the support structure 340, while the damping component part 310 in FIG. 7C has no corresponding guide structures 380 at the damping component part 310.

As regards the question of implementation of the damping structures 350, the embodiment examples shown thus far have only been those in which exactly two damping portions 420 were implemented for each damping structure 350. Of course, other embodiment examples can diverge from this. For example, a damping structure 350 can also include only one single guide portion 420 or possibly also a plurality of guide portions 420. FIGS. 8A to 14D show various embodiments of damping component parts 310 in which further variants of corresponding damping structures 350 are implemented. Correspondingly, in order to achieve aimed-for characteristics which may include, for example, a determined damping characteristic or a determined resiliency, the damping portions 420 of the damping component part 310 can, for example, be coated or formed of a different material such as a rubber or other elastomer, for example. In principle, the damping portions 420 and associated damping structures 350 can be implemented in any form. Some of the possible forms are shown in FIGS. 8 to 14, wherein drawing parts a show a top view, drawing parts b show a side view, drawing parts c show a cross-sectional view along a cross section plane A-A running through the axis of rotation 140, and drawing parts d show a perspective view of the relevant damping component parts 310. The following description will essentially focus on the differences compared to the embodiment forms described above.

FIGS. 8A to 8D show a damping component part 310 in which there are no guide structures 380 provided at the guide portions 370 as was already shown, for example, in FIG. 7C. The damping structures 350 have exactly one damping portion 420 having a circular arc-shaped cross section in a plane perpendicular to the axis of rotation 140. Accordingly, in view of the circular arc shape, this is a damping component part 310 in which the damping portion 420 or damping structure 350 is formed as a hollow body. In this way, it can be possible optionally to realize greater elasticity or a reduced force delivery compared to a solid-body implementation.

FIG. 9 shows a further damping component part 310 which differs from that described referring to FIG. 8 in that it has no guide portions 370 extending radially, in the present case radially inwardly, from the support structure 340 toward the axis of rotation 140.

FIG. 10 shows a further damping component part 310 which differs from that shown in FIG. 9 essentially in that the support structure 340 in this case has a plurality of circumferential portions 360 which connect the damping portions 420 of the damping structures 350 to one another and which are substantially ring segment-shaped or hollow-cylindrical segment-shaped in each instance. Owing to the fact that this damping component part 310 is also intended for four damper masses 110, the support structure 340 correspondingly has four circumferential portions 360 which join the relevant damping portions 420 to one another, but without bridging them. In other words, in this damping component part 310 a direct straight line can be drawn starting from the axis of rotation 140 so as to intersect the damping portions 420 without first passing the support structure 340. Accordingly, FIG. 10 shows a configuration of the damping component part 310 in which the support structure 340 is not a contiguous structure but rather is made up of individual portions, namely, circumferential portions 360.

FIG. 11 shows a further embodiment of a damping component part 310 which is similar to the damping component part 310 from FIGS. 8A to 8D. In this case too, the support structure 340 again has guide portions 370, but the damping structures 350 are constructed differently. The damping structures 350 have a damping portion 420 which has essentially a web-shaped outer contour and is formed as a solid body. The web extends substantially along a radial direction away from the axis of rotation 140. The web-like structure is constructed so as to be rounded at a radially outwardly located region, and a contour of the damping portions 420 or damping structures 350 does not substantially change, i.e., is constant, along the axis of rotation 140.

FIG. 12 shows a further damping component part 310 which differs in two features from that shown in FIG. 11. For example, the guide portions 370 do not extend as far radially inward as was the case with the damping component part 310 from FIG. 11. Beyond that, the damping structures 350 are no longer web-shaped but, instead, there are two damping portions 420-1, 420-2 which are each formed as hollow-cylindrical structures. The latter are directly connected to the support structure 340 which is in turn formed as an annular or hollow-cylindrical structure. The two substantially hollow cylindrical damping portions 420-1, 420-2 are arranged and oriented so as to be mirror-symmetrical to corresponding symmetry planes 430.

In this case, in contrast to the embodiment examples described above in which the damping portions 420 are not connected to one another otherwise than through the support structure 340, the two damping portions 420 are also directly connected to one another and accordingly form a figure-8 structure which is arranged at a 90-degree rotation to the support structure 340 with respect to a radial direction. An outer contour and an inner contour of the relevant damping portions 420 and, therefore, of the damping structure 350 along the axial direction 140 essentially do not change. Of course, this may differ in other embodiment examples.

FIG. 13 shows a further damping component part 310 which differs from that in FIG. 9 essentially in that the damping portion 420 is no longer connected directly to the support structure 340. While the damping portion 420 is also substantially hollow-cylindrical segment-shaped or ring segment-shaped in this case also, the ends in circumferential direction 160 no longer merge directly in the support structure 340. Rather, this damping component part 310 has a connection portion 440 which is web-shaped and faces radially away from the axis of rotation 140 while connecting the damping portion 420 to the support structure 340 symmetrical to the planes of symmetry 430. In this way, it can be possible optionally to further increase a flexibility of the damping structure 350 compared to the embodiment shown in FIG. 9 in that the damping portions 420 are now no longer directly connected to the support structure 340 but rather via the connection portions 440. Accordingly, the damping portions 420 in this damping component part 310 no longer have two connections to the support structure 340 but rather only one which can optionally have a greater flexibility with respect to a shearing movement owing to its elongated shape.

Finally, FIG. 14 shows a further damping component part 310 which differs from the damping component part 310 shown in FIG. 13 in that the connection portions 440 are no longer web-shaped but rather are in turn also hollow-cylindrical or circular arc-shaped in a corresponding plane perpendicular to the axis of rotation 140. In this way, it can be possible optionally to achieve increased stiffness with respect to a shearing deformation of the damping portions 420 compared to the damping component part 310 from FIG. 13.

FIG. 15 shows a view of a tuned mass vibration damper 300 comparable to FIG. 3A in which the damping component part 310 described in connection with FIG. 14 is implemented instead of the damping component part 310 described in FIG. 3A. Here again, the second guide component part 130-2, also referred to as right-hand path plate, is not shown in the interest of greater clarity. In other words, FIG. 15 shows the assembly of the tuned mass vibration damper 300, also referred to as speed-adaptive damper, comprising the variant of the damping component part 310 from FIG. 14. As can be seen from the illustration, the damping component part 310 is installed independently from the spacer rivets 180. Of course, the rivets 180 can also be included in the geometry of the damping component part 310 or can be taken into account in some other way. For example, they can be located in the round cutouts of the connection portions 440, possibly also in corresponding structures of the damping portions 420. In so doing, the spacer rivets 180, i.e., the spacer pieces or rivets, do not serve to radially support the damping component part 310 or fix it in circumferential direction. The damping component part 310 is also rotatably mounted in this instance.

Embodiment examples of a tuned mass vibration damper 300 can also include, for example, a plastic ring for supporting damper masses 110, also referred to as flyweights, to improve acoustics. A tuned mass vibration damper 300 of this kind can be implemented, for example, as a speed-adaptive mass damper. The damping component part 310 can serve, for example, as a driver element.

Figure 16:
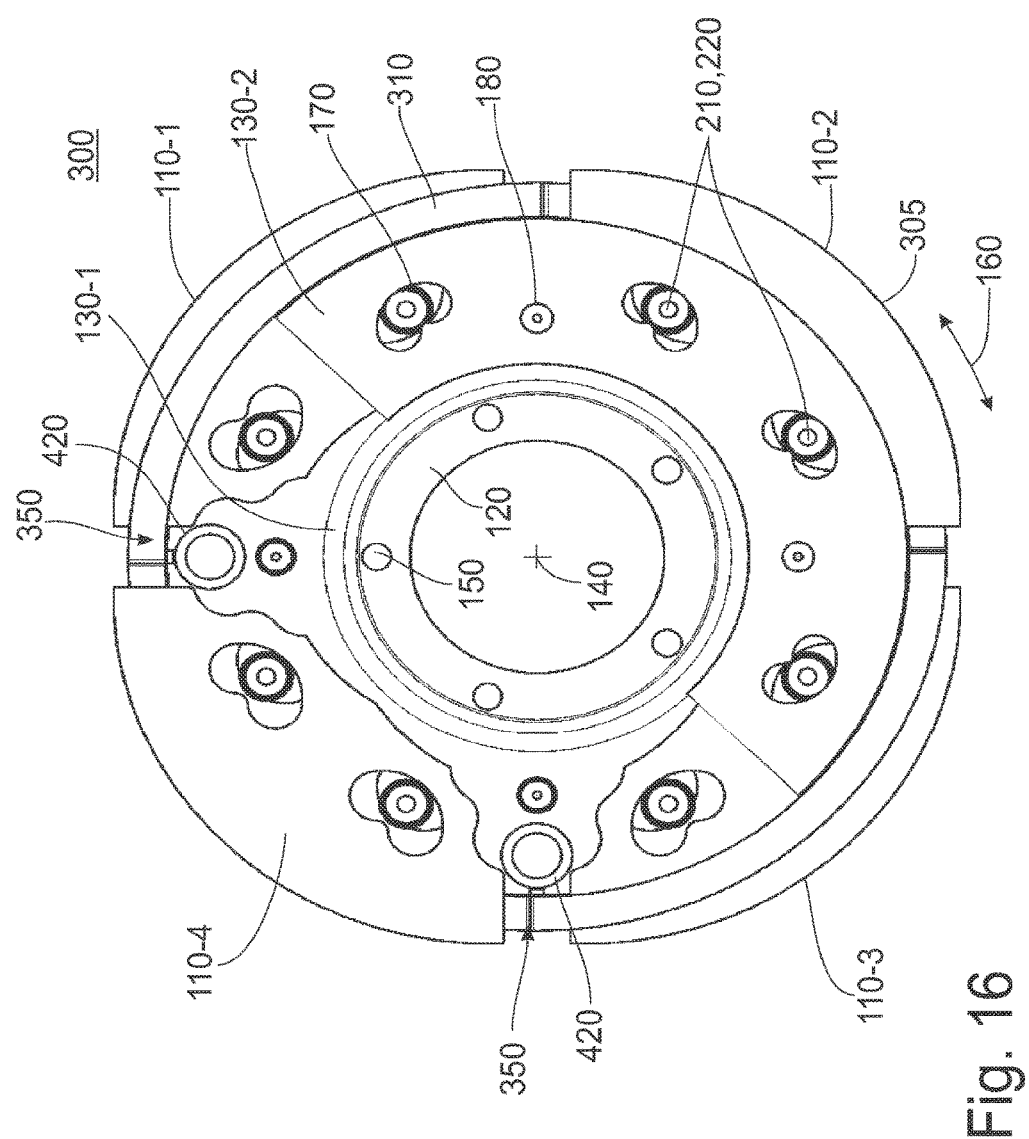
FIG. 16 shows a fragmentary front view of a tuned mass vibration damper according to an embodiment example.

FIG. 16 shows a fragmentary front view of a further embodiment example of a tuned mass vibration damper 300 according to an embodiment example. For better clarity, the second guide component part 130-2 is shown in section. The tuned mass vibration damper 300 again has two guide component parts 130-1, 130-2 which are also called left-hand path plate and right-hand path plate because of the guide paths 170 which are implemented therein and which are often plate-shaped. Here again, the tuned mass vibration damper 300 has a damping component part 310, also referred to as spacer ring. The two guide component parts 130-1, 130-2 are again connected to one another by a plurality of spacer rivets 180, also referred to as rivet or spacer pieces. Again, the tuned mass vibration damper 300 has damper masses 110-1, 110-2, 110-3, 110-4, also referred to as flyweights. The latter are guided in the corresponding guide paths 170 of the guide component part 130 and damper masses 110 by means of rolling bodies 210 which can be constructed, for example, as stepped rollers 220.

FIG. 16 shows the assembly of the tuned mass vibration damper 300 and components thereof with the damping component part 310 installed in neutral position in which the damper masses 110 occupy their center position.

Further, FIG. 16 shows the damping structures 350 and damping portions 420 of the damping component part 310. In the present case, the damping portions 420 are constructed as hollow cylinders. The construction of the damping component part 310 will be described in more detail referring to FIGS. 17A, 17B, 18A, 18B, 180 and 18D.

Figure 17:
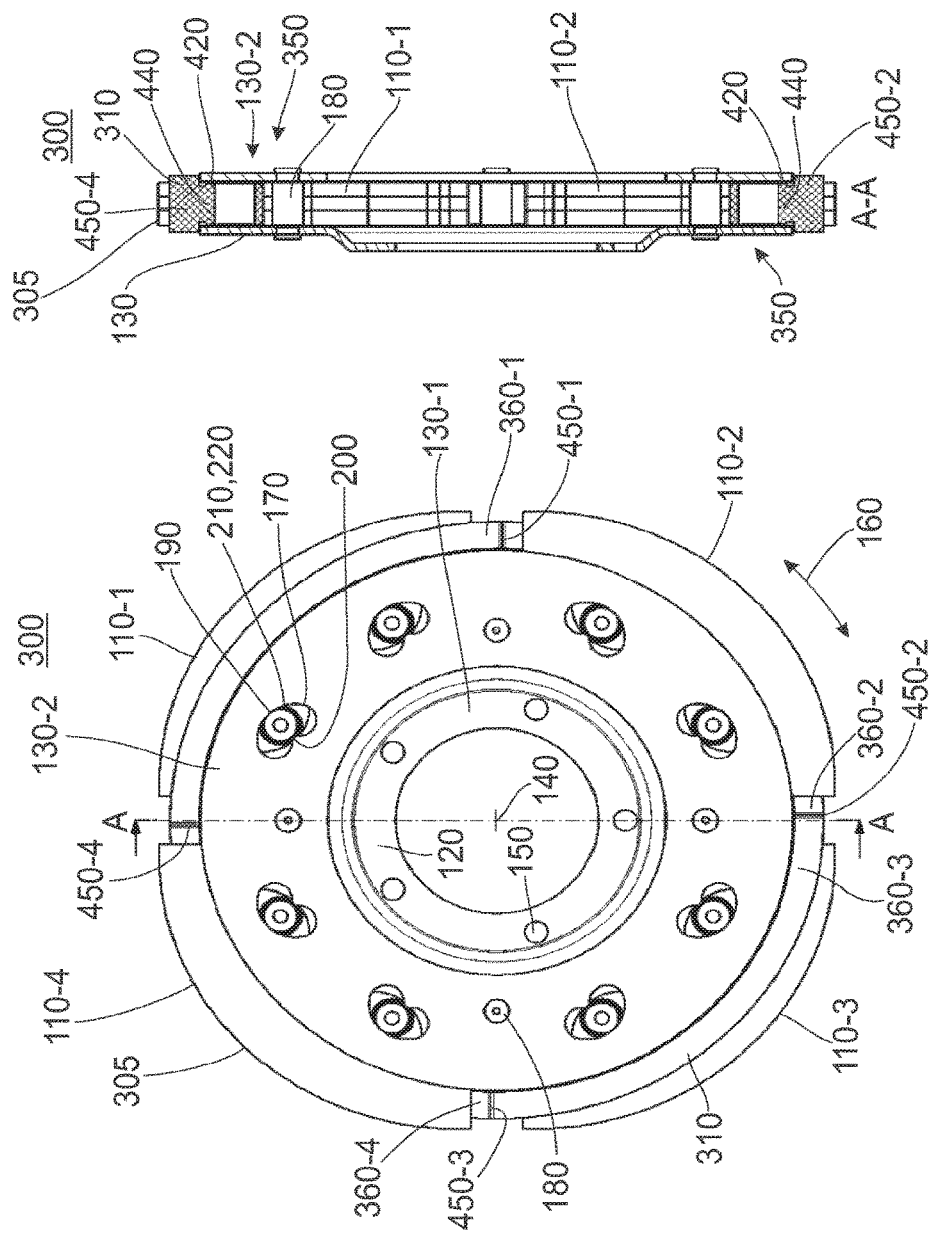
FIG. 17A shows a top view of the tuned mass vibration damper shown in FIG. 16 according to an embodiment example.
FIG. 17B shows a cross-sectional view through the tuned mass vibration damper shown in FIG. 17A.

FIG. 17A shows a top view of the entire tuned mass vibration damper 300 with installed damping component part 310. FIG. 17B shows the tuned mass vibration damper 300 in a corresponding sectional view along plane A-A shown as section plane in FIG. 17A. In contrast to FIG. 16, the second guide component part 130-2 is not shown in section in FIG. 17.

As is already shown by the partial arrangement of the damping component 310 in front of damper masses 110-1 and 110-3 and behind damper masses 110-2 and 110-4, this damping component part 310 has a plurality of circular-arc segment-shaped or hollow-cylindrical segment-shaped circumferential portions 360-1, 360-2, 360-3 and 360-4. Accordingly, the number of circumferential portions 360 precisely corresponds to the number of damper masses 110 in the embodiment shown here. Of course, this can be implemented differently in other embodiment examples.

Circumferential portions 360-1 and 360-3 of support structure 340 of damping component part 310 are located radially on the second guide component part 130-2, while circumferential portions 360-2 and 360-4 lie on the first guide component part 130-1. Here, the relevant circumferential portions are shaped rather as ring segments in which an extension along the axis of rotation 140 is shorter than a radial extension thereof.

The individual circumferential portions 360, which are also arranged along the circumferential direction 160, corresponding to their number, as adjacent circumferential portions, are connected through four axial portions 450-1, 450-2, 450-3 and 450-4. Axial portion 450-1 connects circumferential portions 360-1 and 360-2, axial portion 450-2 connects circumferential portions 360-2 and 360-3, axial portion 450-3 connects circumferential portions 360-3 and 360-4, and axial portion 450-4 connects circumferential portions 360-4 and 360-1. As suggested by their designation, the axial portions extend substantially along the axial direction, i.e., along the axis of rotation 140.

In the construction shown here, axial portions 450 extend in a region between the damper masses 110. Therefore, they are likewise used via corresponding connection portions 440 for arranging or guiding the damping portions 420 which are shown in cross section in the sectional view in FIG. 17B.

As can be seen in FIGS. 17A and 17B, for example, the damping component part 310 is no longer shaped as an inner ring in which the damping structures 350 extend radially outward, but rather as an outer ring in which the relevant damping structures 350 extend radially inward. It can further be seen from FIGS. 17A and 17B that the damping component part lies on the outer annular surfaces of the two guide component parts 130-1, 130-2 and is accordingly guided in circumferential direction 160 and likewise held in radial direction by the guide component parts 130. The damping component part 310 is held and guided axially along the axis of rotation 140 between guide component parts 130 by damping portions 420 of the damping structures 350.

FIGS. 18A, 18B, 18C and 18D show, respectively, a top view, a side view, a sectional view of a section plane A-A shown in FIG. 18A, and a perspective view of the damping component part 310 of the tuned mass vibration damper 300 from FIGS. 16, 17A and 17B. The structure described with reference to FIGS. 17A and 17B is shown again in FIGS. 18A to 18D.

These figures show much more clearly than FIGS. 17A and 17B the arrangement of the circumferential portions 360 with the axial portions 440 arranged therebetween and the connection portions 440 arranged at the latter and the damping portions 420 which are in turn arranged at the latter. Damping portions 420 which, as was already mentioned, are constructed as hollow cylinders have center points which are arranged on a common pitch circle 460. These damping portions 420 are connected to the support structure 340 via connection portions 440, or more exactly, the circumferential portions 360 thereof are connected via the connection portions 440 which have a smaller extension than an extension of the damping portions 420 along the axis of rotation 140. In this way, it can be possible optionally to prevent the connection portions 440 from making contact with the guide component parts 130, not shown in FIGS. 18A to 18D, to prevent line contact or point contact by effects due to manufacture which may be brought about by edge radii or the like, which could possibly lead to increased mechanical loading of the damping component part 310.

Accordingly, the damping component part 310 is shown in four views in FIGS. 18A to 18D. The damping component part 310 can again be formed of a plastic, for example. Therefore, properties of the damping component part 310 such as stiffness, strength, sliding ability and other parameters can be influenced through the selection of material.

With respect to function, a free oscillation angle of the damper masses 110 is limited also in this embodiment example of a tuned mass vibration damper 300 by means of the damping component part 310, also referred to as ring element or spacer ring, which is guided between the guide component parts 130 and/or outwardly of guide component parts 130 of the tuned mass vibration damper 300. Starting from an adjustable oscillating angle, the damping structures 350 located between the damper masses 110, i.e., the portions of the damping component part 310 located between the damper masses 110, are possibly compressed and, therefore, elastically deformed so that a deflection of the damper masses 110 beyond the adjusted angle is damped. During operation or after the engine is switched off as well as in crawl operation of the vehicle, this can result in a damping of the damper masses 110 in the stops thereof or in the ends 230 of the guide paths 170.

Due to the rotatable supporting of the damping component part 310, the free oscillation of the damper masses 110 in the defined angle is hardly impaired or possibly entirely unimpaired. Further, the damper masses 110 can be supported relative to one another by spring rings when dropping down and can therefore be held so as to be spaced apart so that they can be prevented from colliding with one another, which could occur, for example, when the engine is switched off.

Accordingly, a rattling noise which may be perceptible in the vehicle as well as outside of the vehicle in a conventional solution can be reduced or eliminated to the extent that it is no longer perceptible. Accordingly, a functionality of the damper masses 110 can be maintained unimpeded in that the damping component part 310 is rotatable and a rigid coupling is not implemented between the damper masses 110. Therefore, every damper mass 110 works alone or by itself precisely because the damper masses 110 are not coupled with one another.

Figure 19:
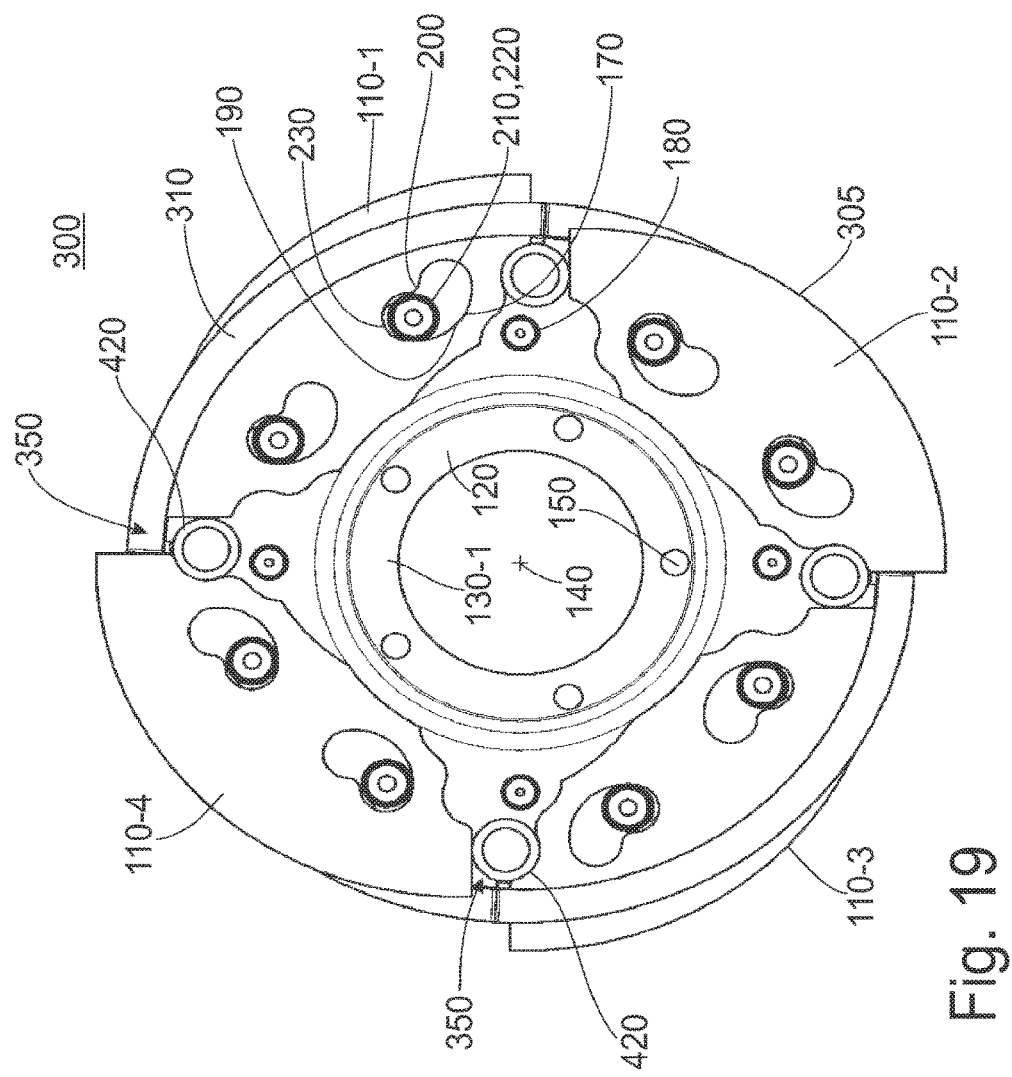
FIG. 19 shows a top view of a tuned mass vibration damper according to an embodiment example with damper masses at maximum deflection in which a guide component part is not shown.

FIG. 19 shows a view of the tuned mass vibration damper 300 which is comparable to FIG. 16 but in which the second guide component part 130-2 is not shown for the sake of better clarity. Apart from this, FIGS. 16 and 19 differ in that the damper masses 110 in FIG. 16 are arranged substantially in their center position, whereas in the situation depicted in FIG. 19 they are located in the region of their path ends 230, i.e., in the region of the maximum torsional angle or oscillating angle.

FIG. 19 shows the tuned mass vibration damper 300 with damper masses 110 deflected to the maximum extent. Before the damper masses 110 can reach their stops or ends 230 of their guide paths 170, also referred to as oscillating paths, an elastic deformation (compression) is carried out at the portions located between the damper masses 110, i.e., inter alia at the damping portions 420 of the damping component part 310. These damping portions 420 are also referred to as compression bodies. In this way, an impact of the damper masses 110 against the respective path ends 230 is damped. In this connection, the damping component part 310 executes a comparatively small amplitude.

More precisely, FIG. 19 shows the situation during engine operation. The free oscillation angle of the damper masses 110, which is given in the present embodiment example precisely by the fact that no significant compression or elastic deformation is achieved at the damping structures 350 through the damper masses 110, as well as the maximum torsional angle (maximum oscillation angle) of the damping component part 310 can be adapted as needed via a change in the geometry of the damper masses 110 and damping structures 350, for example, by adapting the damping portions 420. Accordingly, it may be advisable to adapt the shape of the damper masses 110 to a shape of the damping structures 350 or damping portions 420 in an area in which the damper masses 110 make contact with the damping structure 350.

It can be possible in this way to eliminate the above-described collision of damper masses 110 with one another during operation so that greater masses of the damper masses 110, i.e., a greater mass of the flyweights, can possibly be realized.

As was already mentioned, the conditions are different in a further state in which the engine is switched off, or has already been switched off, but the transmission input shaft continues to run, or in a crawl operation of the engine. During slow crawling, the transmission input shaft rotates at a lower rate of rotation than the engine. In this state, the weight force 250 of the damper masses 110 is appreciably higher than the opposed component of centrifugal force 240. The situation is similar when switching off the engine. The transmission input shaft continues to run for several seconds. After a determined time, the weight force exceeds the opposed centrifugal force component, and the damper masses 110 can drop in an uncontrolled manner in both of the states described above.

FIGS. 20A and 20B show a view of the tuned mass vibration damper 300 in two different operating situations. For simplicity, the second guide component part 130-2 is not shown again.

FIG. 20A shows a situation corresponding to the operation of the motor vehicle. In operation, the damper masses 110 are pressed radially outward due to the comparatively high centrifugal forces 240 and correspondingly move along their guide paths 170. The movement of the damper masses 110 is essentially predetermined by the geometry of the guide paths 170 in the damper masses 110 and in the relevant guide component parts 130.

However, during a crawl operation of the vehicle or when the engine is switched off, the centrifugal force 240 may no longer be sufficient to keep the damper masses 110 in their nominal positions. Depending on the angular position of the tuned mass vibration damper 300, they either fall down or slide along the guide paths 170. The damping component part 310, also referred to as spacer ring, prevents the nominal movement of the damper masses 110 in the guide paths 170 in that they are supported relative to one another as is shown in FIG. 20B. This prevents the damper masses 110 from dropping into their path ends 230 or at least softens the fall to the extent that the rattling noise described above no longer occurs or at least not to the same extent. In other words, it can be possible in this way to prevent the rattling noise.

Figures 21A, 21B, 21C, 21D:
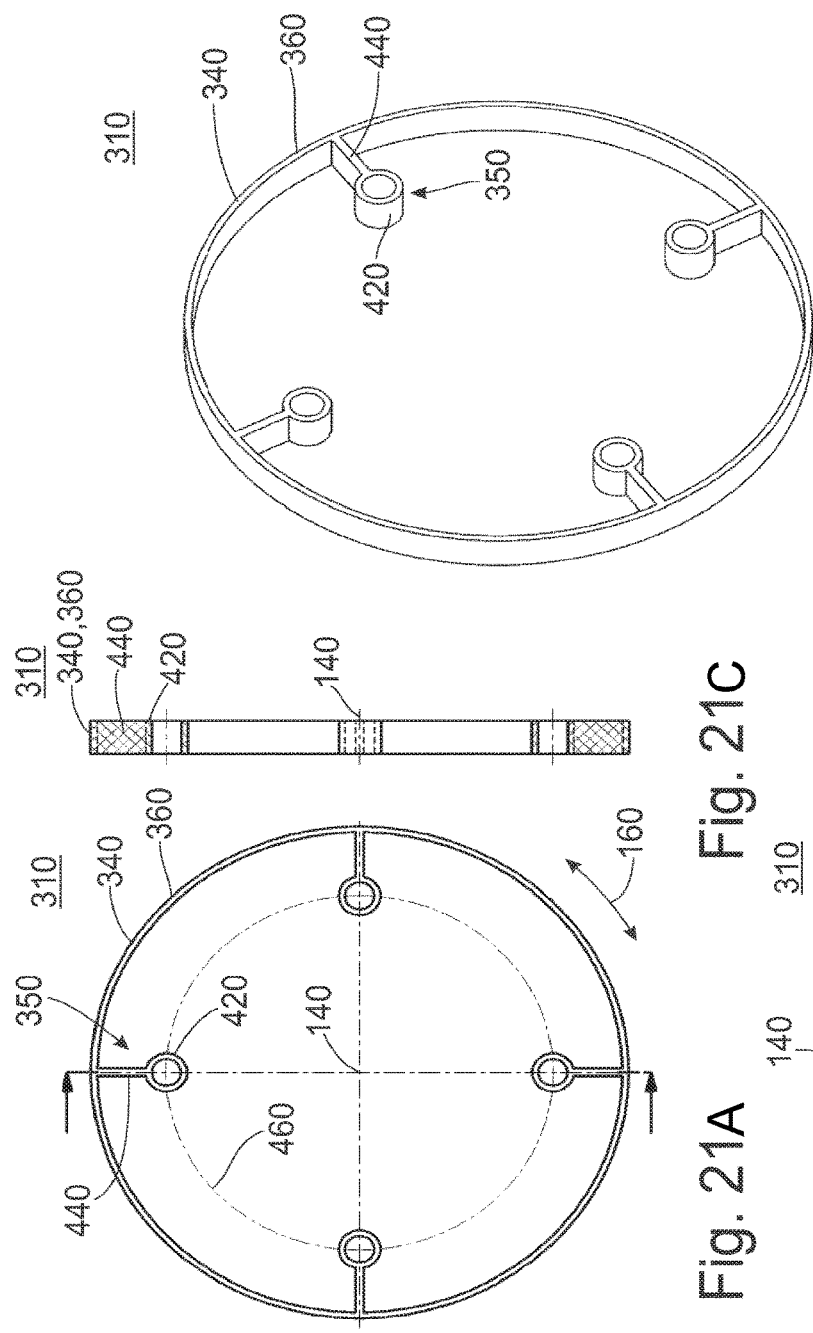
FIGS. 21A, 21B and 21C show a top view, a side view and a cross-sectional view through a further damping component part of a tuned mass vibration damper according to an embodiment example.
FIG. 21D shows a perspective view of the damping component part shown in FIGS. 21A to 21C.

FIGS. 21A, 21B, 210 and 21D show a further possible variant of a damping component part 310 in which a radial support of the damping component part 310 on the guide component parts 130 is not implemented. FIG. 21A shows a top view of the damping component part 310, FIG. 21B shows a side view of the damping component part 310, FIG. 21C shows a sectional view of the damping component part 310 along the section plane A-A shown in FIG. 21A, and FIG. 21D shows a perspective view of the damping component part 310.

Figure 18:
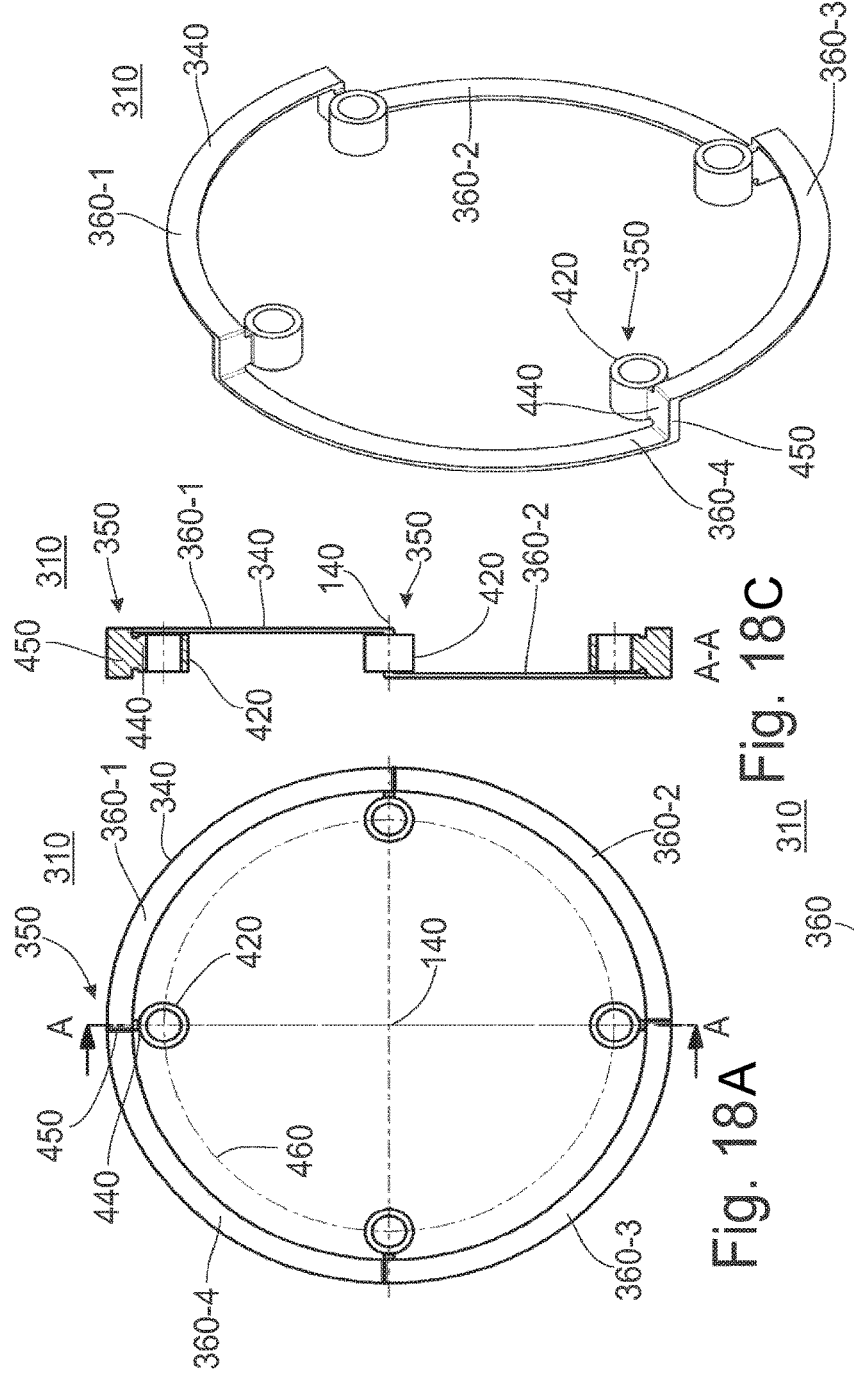
FIGS. 18A, 18B and 18C show a top view, a side view and a cross-sectional view through a further damping component part of a tuned mass vibration damper according to an embodiment example.
FIG. 18D shows a perspective view of the damping component part shown in FIGS. 18A to 18C.

The damping component part 310 from FIG. 21 differs from that in FIG. 18 is several aspects. Specifically, the support structure 340 is now formed as a hollow cylinder so that the support structure 340 also has only one circumferential portion 360. Accordingly, the axial portions 450 which connected the individual circumferential portions 360 in FIG. 18 are dispensed with.

In this case, the damping portions 420 are again shaped as hollow cylinders which are in turn connected via corresponding connection portions 440 to the support structure 340. However, in this case the connection portions 440 extend appreciably farther radially inward than in the damping component part 310 in FIG. 18. Correspondingly, the center points of the damping portions 410 are arranged on a smaller pitch circle 460. The connection portions 440 are web-shaped in this case and extend substantially radially inward proceeding from the support structure 340.

In this embodiment, the damping portions 420 (compression bodies) of the damping component part 310 are located between the guide component parts 130 of the tuned mass vibration damper 300 so that the damping component part 310 is fixed in axial direction. However, the damping component part 310 is freely movable radially and is supported only via the support structure 340 and damping structures 350 on the damper masses 110. Accordingly, when the damper masses 110 drop down the damping component part can move along with them in direction of gravity force. In this way, it can be possible optionally to further reduce an influence of the damping component part 310 on the functioning of the damper masses 110 and accordingly to have less of a negative effect, or none at all, on the performance of the tuned mass vibration damper 300.

Further exemplary constructions of a damping component part 310 in which the damping component part 310 is supported in radial direction only on one of the guide component parts 130 are shown in the following FIGS. 22, 23 and 24 and the parts thereof. This configuration can make it possible optionally to carry out the damping component part 310 in a tuned mass vibration damper 300 (speed-adaptive damper) also with a slight spacing between the damper masses 110 and other component parts on a side of the damper masses 110 along the axis of rotation 140.

FIGS. 22A, 22B and 22C show a further damping component part 310 in a top view, cross-sectional view along a section plane A-A shown in FIG. 22A, and in a perspective view. In this case again, the support structure 340 is configured in such a way that it has only one single circumferential portion 360 which completely surrounds the axis of rotation 140 and is ring-shaped, i.e., has an extension along the axis of rotation 140 which is smaller than a corresponding extension in radial direction. In contrast, a hollow-cylindrical shape has an extension along the axis of rotation 140 which has at least an extension of the hollow cylinder within the meaning of a difference between an outer radius of the hollow cylinder and an inner radius of a hollow cylinder along the radial direction.

In the present embodiment of the damping component part 310, the connection structures 440 are arranged along the axis of rotation 140 and guide the damping portions 420 on the pitch circle 460 radially inward toward the axis of rotation 140. In this way, it is possible to use the support structure for radial guiding at one of the guide component parts 130 (not shown in FIG. 22). Here also, the damping portions 420 are hollow-cylindrical.

FIGS. 23A, 23B, 23C and 23D again show a further damping component part 310 in a top view, a side view, a cross-sectional view along the section plane A-A shown in FIG. 23A, and in a perspective view. This damping component part 310 differs from the damping component part 310 shown in FIG. 22 essentially with respect to the construction of the support structure 340. This support structure 340 has four circumferential portions 360-1, 360-2, 360-3, 360-4, each of which is ring segment-shaped and connected to one another via the damping structures 350. The circumferential portions 360 substantially lie in a plane such as is shown by way of example in FIGS. 23B and 23C so that no axial portions 450 are implemented here either.

More precisely, the damping structures 350 in this case again have hollow-cylindrical or hollow-cylindrical segment-shaped damping portions 420 which are mechanically coupled to two adjacent circumferential portions 360, for example, circumferential portions 360-1 and 360-4, by means of two connection portions 440-1, 440-2, respectively. In this way, it can be possible optionally to also implement a determined spring effect along the circumferential direction 160. Here again, the damping component part is guided radially through a guide component part 130, not shown in FIG. 23.

FIGS. 24A, 24B, 24C and 24D show, respectively, a further damping component part 310 in a top view, a side view, a sectional view along a section plane A-A shown in FIG. 24A, and a perspective view. This damping component part 310 differs from the damping component part 310 shown in FIG. 23 essentially in that, instead of the two separate connection portions 440-1, 440-2, a U-shaped connection portion 440 is used which, in addition to two legs extending in axial direction, also has a portion extending along the circumferential direction 160. By means of this U-shaped connection portion 440, the damping portions 420 of the damping structures 350 are arranged on the pitch circle 460 and respectively connect two adjacently arranged circumferential portions 360, for example, circumferential portions 360-1, 360-4.

FIGS. 25A, 25B, 25C and 25D show a further damping component part 310 in a top view, a side view, a sectional view along a section plane A-A shown in FIG. 25A, and a perspective view. This damping component part 310 differs from the damping component part 310 shown in FIG. 24 in that it has a guide structure 380 at a side remote of the support structure 340 along the axis of rotation 140, this guide structure 380 being implemented in the form of a projection 390. As a result of the guide structure 380, the damping component part 310 is no longer supported at only one guide component part 130, but can now be supported at two guide component parts 130-1, 130-2 (not shown in FIG. 25). In other words, the drawing parts in FIG. 25 show a further variant of the damping component part 310 in which the latter can be supported in radial direction on both guide component parts 130.

It should be mentioned again here purely for the sake of completeness that the damping portions 420 can, of course, also be constructed from solid material instead of as a hollow body as has been the case in the description thus far. Not only can the hollow-cylindrical or hollow-cylindrical segment-shaped configurations be selected, but also diverse variations with respect to geometry and composition can be selected. Some of these variations are shown by way of example in FIGS. 26A to 26D.

FIGS. 26A to 26D show, respectively, a detail of a damping component part 310 with a damping structure 350 and a damping portion 420 which are directly or indirectly connected to the support structure 340. In the case of the damping component part 310 from FIG. 26A, the damping portion 420 is web-shaped and extends substantially along the radial direction. It has at both sides along the circumferential direction 160 a coating 470 of the surfaces of the damping portion 420. This coating 470, also referred to as damping layer, can be made of different materials, for example, rubber or another elastomer, to mention only one example. The coating can be applied to the damping portion 420 by means of different techniques. It may also be possible to apply the relevant coating not only in the area of the damping portion 420 which can make contact with the damper masses 110, but, on the contrary, it is also possible and perhaps advisable, as the case may be, to coat the entire damping component part 310, for example, to realize desired properties of stiffness, strength, sliding properties or other functional characteristics.

Figure 26A:
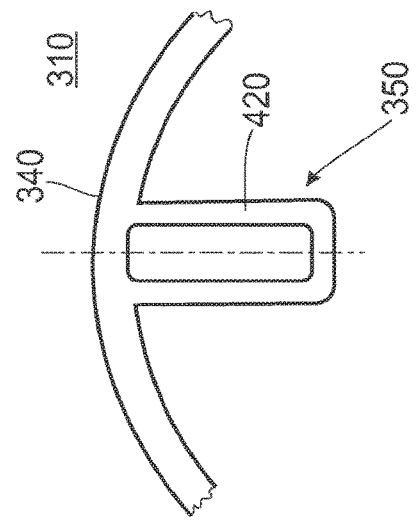
FIGS. 26A, 26B, 26C and 26D each show a top view of different damping structures of damping component parts of tuned mass vibration dampers according to an embodiment example.
Figure 26B:
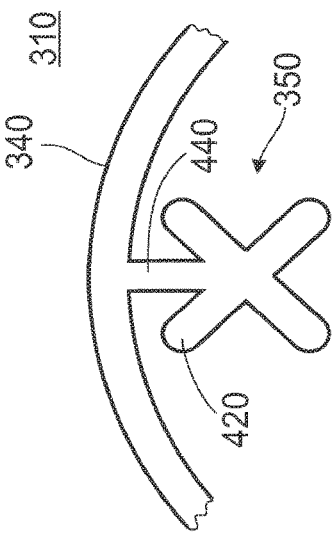

FIG. 26B shows a further embodiment of a damping structure 350 in which the damping portion 420 is substantially U-shaped and in which only one leg of the damping portion 420 is connected to the support structure 340 via a connection portion 440.

Figure 26C:
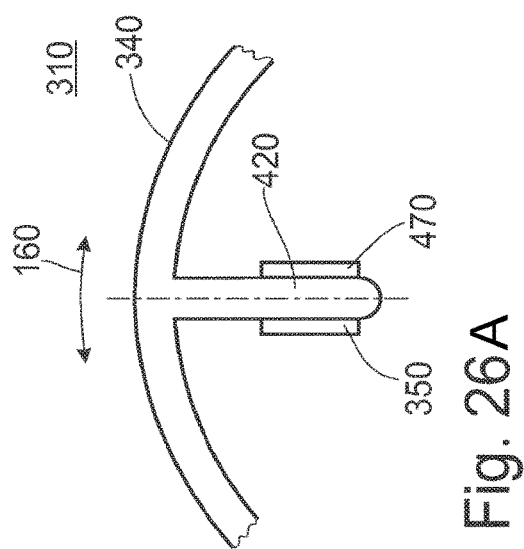

On the other hand, FIG. 26C shows a further embodiment in which the damping structure 350 and damping portion 420 are formed by a hollow box-shaped portion with an outer contour in the shape of a polygon or rectangle extending in a plane perpendicular to the axis of rotation 140.

Figure 26D:
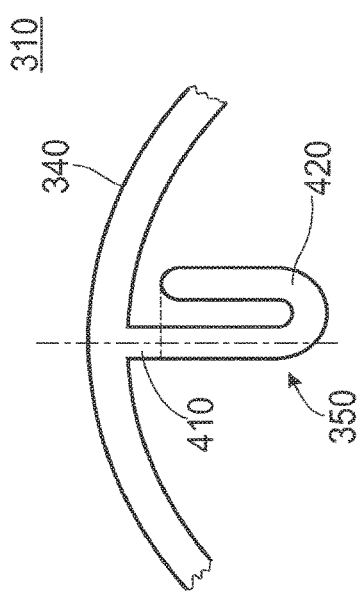

Finally, FIG. 26D shows an embodiment of a damping structure 350 in which the damping portion 420 is cross-shaped and is likewise connected to the support structure 340 via a connection portion 440.

FIGS. 27A to 27D and 27A to 27C show a further variant of a damping component 310 and a corresponding tuned mass vibration damper 300 according to an embodiment example. This variant is a damping component 310 with only two damping portions 420 located opposite each other. When using a variant of this type, it may be advisable to install two damping components 310 within a tuned mass vibration damper 300 as is indicated in FIGS. 27A to 27C. The two damping component parts 310, which can possibly be identically constructed, can be installed at a 90-degree rotation with respect to one another. FIGS. 27A, 27B, 27C and 27D show a top view, a side view, a sectional view along the section planes A-A shown in FIG. 27A, and a perspective view through the damping component part 310 which very closely resembles the damping component part 310 shown in FIGS. 24A to 24D. It differs from the damping component part 310 shown in FIG. 24 essentially in that, instead of four damping structures 350, the damping component part 310 now has only two damping structures 350 located opposite one another, i.e., arranged at an offset of 180° with respect to one another. These damping structures 350 are substantially identical to those in FIG. 24. Only the connection portions 440 have an additional small recess 480 at a radially inwardly located area which can be implemented, for example, to reduce weight, but also to adapt to a mechanical characteristic of the relevant damping component part 310.

FIGS. 28A and 28B show the overall assembly of the tuned mass vibration damper 300 according to an embodiment example in a sectional view and in an isometric or perspective view in which the second guide component part 130-2 is again omitted for better clarity. The constructional configuration of the tuned mass vibration damper 300 corresponds substantially to that of the tuned mass vibration damper 300 shown in FIGS. 16, 17A and 17B. However, the two tuned mass vibration dampers differ in that different damping component parts 310 are used. Whereas one individual damping component part 310 was used in the arrangement shown in FIGS. 16, 17A and 17B, two damping component parts 310-1, 310-2 are used in this case and are integrated so as to be turned substantially by 90° relative to one another at opposite sides along the axis of rotation 140 at ends of the tuned mass vibration damper 300. The first damping component part 310-1 has the two damping structures 350-1 and 350-2, while the second damping component part 310-2 has the two damping structures 350-3 and 350-4. FIG. 28C shows the orientation of the two damping component parts 310-1, 310-2 relative to one another without the further components of the tuned mass vibration damper 300.

Accordingly, this tuned mass vibration damper 300 comprises at least four damper masses 110 and at least two damping component parts 310. The damping component parts 310 are arranged and configured precisely in such a way that each of the damper masses 110 can make contact with a damping structure 350 of a different damping component part 310 during a movement along a first direction along the circumferential direction 160 than during a movement along a second direction opposite to the first direction.

More precisely, the two damping component parts are arranged precisely in such a way that a first damping structure of the second damping component part 310 is arranged between the first damper mass 110-1 and the second damper mass 110-2 arranged adjacent to the latter. A second damping structure 350-4 of the second damping component part 310-2 is likewise arranged between the third damper mass 110-3 and the fourth damper mass 110-4 arranged adjacent to the latter. Also, the first damping structure 350-1 of the first damping component part is arranged between the fourth damper mass 110-4 and the first damper mass 110-1 arranged adjacent to the latter.

This also applies to the second damping structure 350-2 of this damping component part 350-1 which is arranged between the second damper mass 110-2 and the third damper mass 110-3 arranged adjacent to the latter. The damping structures 350 are all formed and arranged precisely in such a way that the relevant damper masses 110 between which they are arranged can make contact with them in order to prevent the two adjacent damper masses 110 from touching one another in the manner described above.

In this case also, damping component parts 310 can be used, for example, as ring elements to improve acoustics in speed-adaptive dampers such as can be used, for example, in hydrodynamic converters or other start-up elements.

The embodiment examples and individual features thereof disclosed in the preceding description, appended claims and accompanying drawings can be significant and can be implemented individually as well as in any combination for realizing an embodiment example in its various refinements.

What is claimed:

1. A tuned mass vibration damper (300) for a drivetrain of a motor vehicle for damping a vibration component of a rotational movement, comprising:

four damper masses (110) configured to carry out an oscillation depending on the rotational movement to damp the vibration component of the rotational movement;

at least one guide component part (130) configured to movably guide the four damper masses (110) such that the damper masses (110) are arranged so as to be offset along a circumferential direction (160) perpendicular to an axis of rotation (140) of the rotational movement;

two damping component parts (310) whereby one of the damping component parts (310-1) is disposed axially below the damper masses and another of the damping component parts (310-2) is disposed axially above the damper masses (110) so as to sandwich the damper masses (110) between the two damping component parts (310) which are rotatable around the axis of rotation (140) of the rotational movement opposite to the at least one guide component part (130), each of the two damping component parts (310) comprising a circular support structure (340) and two damping structures (350) connected to each of the support structures (340), the two damping structures of each support structure are located opposite one another by an offset of 180° and the two damping structures (350) of one of the support structures are rotationally offset by substantially 90° relative to another two of the two damping structures of the other of the two support structures;

wherein the damping component parts (310) are arranged and configured such that each damper mass (110) can make contact with a damping structure (350) of a different damping component part (310) during a movement along a first direction in circumferential direction (160) than during a movement along a second direction opposite to the first direction; and the two damping structures (350) extending radially from the support structure (340) and being constructed and arranged such that one damping structure (350) of the two damping structures (350), when making contact with one of two adjacent damper masses (110), prevents a contact of the two adjacent damper masses (110) through an elastic deformation, and/or such that, when a damper mass (110) of the four damper masses (110) makes contact with a damping structure (350) of the two damping structures (350), a damping component part (310) of the two damping component parts is rotatable around the axis of rotation (140) such that the other of the two damping structures (350) makes contact with another damper mass (110) of the four damper masses (110).

* * * * *